US012183090B2

(12) United States Patent
Agarwal et al.

(10) Patent No.: US 12,183,090 B2
(45) Date of Patent: Dec. 31, 2024

(54) DRIVING SCENARIO UNDERSTANDING

(71) Applicant: Honda Motor Co., Ltd., Tokyo (JP)

(72) Inventors: Nakul Agarwal, San Jose, CA (US);
Yi-Ting Chen, Hsinchu (TW)

(73) Assignee: HONDA MOTOR CO., LTD., Tokyo (JP)

(*) Notice: Subject to any disclaimer, the term of this patent is extended or adjusted under 35 U.S.C. 154(b) by 359 days.

(21) Appl. No.: 17/855,745

(22) Filed: Jun. 30, 2022

(65) Prior Publication Data

US 2023/0154195 A1 May 18, 2023

Related U.S. Application Data

(60) Provisional application No. 63/280,128, filed on Nov. 16, 2021.

(51) Int. Cl.
G06V 10/00 (2022.01)
G06V 10/764 (2022.01)
G06V 10/80 (2022.01)
G06V 10/82 (2022.01)
G06V 20/58 (2022.01)

(52) U.S. Cl.
CPC ............ G06V 20/58 (2022.01); G06V 10/764 (2022.01); G06V 10/806 (2022.01); G06V 10/82 (2022.01)

(58) Field of Classification Search
CPC .... G06V 20/58; G06V 10/764; G06V 10/806; G06V 10/82; G06V 20/588; G06V 10/454; G06V 20/56
See application file for complete search history.

(56) References Cited

U.S. PATENT DOCUMENTS

| 11,741,723 | B2* | 8/2023 | Chen | ........................ | G06N 3/02 |
| | | | | | 382/104 |
| 2018/0129888 | A1* | 5/2018 | Schubert | ................. | G06T 11/20 |
| 2021/0271898 | A1* | 9/2021 | Chen | ................... | G06F 16/7837 |

OTHER PUBLICATIONS

National Highway Traffic Safety Administration: Crash Factors in Intersection-Related Crashes: An On-Scene Perspective (2010).
Ohn-Bar, E., Trivedi, M.M.: Are all objects equal? Deep Spatio-temporal Importance Prediction in Driving Videos. Pattern Recognition 64, 425-436 (2017).

(Continued)

Primary Examiner — Ping Y Hsieh
(74) Attorney, Agent, or Firm — RANKIN, HILL & CLARK LLP

(57) ABSTRACT

According to one aspect, intersection scenario description may be implemented by receiving a video stream of a surrounding environment of an ego-vehicle, extracting tracklets and appearance features associated with dynamic objects from the surrounding environment, extracting motion features associated with dynamic objects from the surrounding environment based on the corresponding tracklets, passing the appearance features through an appearance neural network to generate an appearance model, passing the motion features through a motion neural network to generate a motion model, passing the appearance model and the motion model through a fusion network to generate a fusion output, passing the fusion output through a classifier to generate a classifier output, and passing the classifier output through a loss function to generate a multi-label classification output associated with the ego-vehicle, dynamic objects, and corresponding motion paths.

20 Claims, 13 Drawing Sheets

(56) References Cited

OTHER PUBLICATIONS

Patil, A., Malla, S., Gang, H., Chen, Y.T.: The H3D Dataset for Full-Surround 3D Multi-Object Detection and Tracking In Crowded Urban Scenes. In: ICRA (2019).

Philion, J., Fidler, S.: Lift, Splat, Shoot: Encoding Images from Arbitrary Camera Rigs by Implicitly Unprojecting to 3D. In: ECCV (2020).

Plummer, B.A., Wang, L., Cervantes, C.M., Caicedo, J.C., Hockenmaier, J., Lazebnik, S.: Flickr30k entities: Collecting region-to-phrase correspondences for richer image-to-sentence models. In: Proceedings of the IEEE international conference on computer vision. pp. 2641-2649 (2015).

Qi, M., Qin, J., Li, A., Wang, Y., Luo, J., Van Gool, L.: tagnet: An attentive semantic rnn for group activity recognition. In: Proceedings of the European Conference on Computer Vision (ECCV). pp. 101-117 (2018).

Ramanishka, V., Chen, Y.T., Misu, T., Saenko, K.: Toward driving scene understanding: A dataset for learning driver behavior and causal reasoning. In: Proceedings of the IEEE Conference on Computer Vision and Pattern Recognition. pp. 7699-7707 (2018).

Rasouli, A., Kotseruba, I., Kunic, T., Tsotsos, J.K.: Pie: A large-scale dataset and models for pedestrian intention estimation and trajectory prediction. In: Proceedings of the IEEE/CVF International Conference on Computer Vision. pp. 6262-6271 (2019).

Rasouli, A., Kotseruba, I., Tsotsos, J.K.: Are they going to cross? a benchmark dataset and baseline for pedestrian crosswalk behavior. In: Proceedings of the IEEE International Conference on Computer Vision Workshops. pp. 206-213 (2017).

Roddick, T., Cipolla, R.: Predicting Semantic Map Representations from Images using Pyramid Occupancy Networks. In: CVPR (2020).

Rohrbach, A., Rohrbach, M., Hu, R., Darrell, T., Schiele, B.: Grounding of textual phrases in images by reconstruction. In: European Conference on Computer Vision. pp. 817-834. Springer (2016).

Segal, S., Kee, E., Luo, W., Sadat, A., Yumer, E., Urtasun, R.: Universal Embeddings for Spatio-Temporal Tagging of Self-Driving Logs. In: CoRL (2020).

Sun, P., Kretzschmar, H., Dotiwalla, X., Chouard, A., Patnaik, V., Tsui, P., Guo, J., Zhou, Y., Chai, Y., Caine, B., et al.: Scalability in perception for autonomous driving: Waymo open dataset. In: CVPR (2020).

Szegedy, C., Vanhoucke, V., Ioffe, S., Shlens, J., Wojna, Z.: Rethinking the inception architecture for computer vision. In: Proceedings of the IEEE conference on computer vision and pattern recognition. pp. 2818-2826 (2016).

Tang, Z., Naphade, M., Liu, M.Y., Yang, X., Birchfield, S., Wang, S., Kumar, R., Anastasiu, D., Hwang, J.N.: Cityflow: A city-scale benchmark for multi-target multi-camera vehicle tracking and re-identification. In: CVPR (2019).

Tian, Y., Carballo, A., Li, R., Takeda, K.: Road Scene Graph: A Semantic Graph-Based Scene Representation Dataset for Intelligent Vehicles. In: ICRA (2021).

Tran, D., Bourdev, L., Fergus, R., Torresani, L., Paluri1, M.: Learning Spatiotemporal Features with 3D Convolutional Networks. In: ICCV (2015).

Tran, D., Wang, H., Torresani, L., Feiszli, M.: Video classification with channel-separated convolutional networks. In: Proceedings of the IEEE/CVF International Conference on Computer Vision. pp. 5552-5561 (2019).

Wang, L., Xiong, Y., Wang, Z., Qiao, Y., Lin, D., Tang, X., Gool, L.V.: Temporal segment networks: Towards good practices for deep action recognition. In: ECCV (2016).

Wang, X., Girshick, R., Gupta, A., He, K.: Non-local Neural Networks. In: CVPR (2017).

Wang, Z., Liu, B., Schulter, S., Chandraker, M.: A Parametric Top-View Representation of Complex Road Scenes. In: CVPR (2019).

Wojke, N., Bewley, A.: Deep Cosine Metric Learning for Person Re-identification. In: WACV (2018).

World Health Organization: Global Status Report on Road Safety 2018: Summary (2018).

Wu, C.Y., Feichtenhofer, C., Fan, H., He, K., Krähenbühl, P., Girshick, R.: Long-Term Feature Banks for Detailed Video Understanding. In: CVPR (2019).

Wu, J., Wang, L., Wang, L., Guo, J., Wu, G.: Learning actor relation graphs for group activity recognition. In: Proceedings of the IEEE/CVF Conference on Computer Vision and Pattern Recognition. pp. 9964-9974 (2019).

Xiao, F., Sigal, L., Jae Lee, Y.: Weakly-supervised visual grounding of phrases with linguistic structures. In: Proceedings of the IEEE Conference on Computer Vision and Pattern Recognition. pp. 5945-5954 (2017).

Yan, S., Xiong, Y., Lin, D.: Spatial temporal graph convolutional networks for skeleton-based action recognition. In: AAAI (2018).

Yang, C., Xu, Y., Shi, J., Dai, B., Zhou, B.: Temporal pyramid network for action recognition. In: Proceedings of the IEEE/CVF Conference on Computer Vision and Pattern Recognition. pp. 591-600 (2020).

Yogamani, S., Hughes, C., Horgan, J., Sistu, G., Varley, P., O'Dea, D., Uricar, M., Milz, S., Simon, M., Amende, K., Witt, C., Rashed, H., Chennupati, S., Nayak, S., Mansoor, S., Perroton, X., Perez, P.: WoodScape: A Multi-task, Multi- camera Fisheye Dataset for Autonomous Driving. In: ICCV (2019).

Fisher Yu, Haofeng Chen, Xin Wang, Wenqi Xian, Yingying Chen, Fangchen Liu, Vashisht Madhavan, Trevor Darrell. BDD100K: A Diverse Driving Dataset for Heterogeneous Multitask Learning. In: CVPR (2020).

Yu, S.Y., Malawade, A.V., Muthirayan, D., Khargonekar, P.P., Faruque, M.A.A.: Scene-graph augmented data-driven risk assessment of autonomous vehicle decisions. IEEE Transactions on Intelligent Transportation Systems pp. 1-11 (2021).

Zhan, W., Sun, L., Wang, D., Shi, H., Clausse, A., Naumann, M., Kummerle, J., Königshof, H., Stiller, C., de La Fortelle, A., Tomizuka, M.: Interaction Dataset: An INTERnational, Adversarial and Cooperative moTION Dataset In Interactive Driving Scenarios with Semantic Maps. arXiv:1910.03088 [cs, eess] (2019).

Zhang, L., She, Q., Guo, P.: Stochastic trajectory prediction with social graph network. arXiv preprint arXiv:1907.10233 (2019).

Zhou, B., Andonian, A., Oliva, A., Torralba, A.: Temporal relational reasoning in videos. In: ECCV (2018).

Zhou, L., Louis, N., Corso, J.J.: Weakly-supervised video object grounding from text by loss weighting and object Interaction. In: British Machine Vision Conference (2018), http://bmvc2018.org/contents/papers/0070.pdf.

Zhou, L., Xu, C., Corso, J.J.: Towards automatic learning of procedures from web instructional videos. In: Thirty-Second AAAI Conference on Artificial Intelligence (2018).

Althoff, M., Stursberg, O., Buss, M.: Stochastic Reachable Sets of Interacting Traffic Participants. In: IV (2008).

Baradel, F., Neverova, N., Wolf, C., Mille, J., Mori, G.: Object Level Visual Reasoning in Videos. In: ECCV (2018).

Holger Caesar, Varun Bankiti, Alex H. Lang, Sourabh Vora, Venice Erin Liong, Qiang Xu, Anush Krishnan, Yu Pan, Giancarlo Baldan, Oscar Beijbom. nuScenes: A Multimodal Dataset for Autonomous Driving. In: CVPR (2020).

Carreira, J., Zisserman, A.: Quo Vadis, Action Recognition? A New Model and the Kinetics Dataset. In: CVPR (2017).

Chang, M.F., Lambert, J., Sangkloy, P., Singh, J., Bak, S., Hartnett, A., Wang, D., Carr, P., Lucey, S., Ramanan, D., Hays, J.: Argoverse: 3d tracking and forecasting with rich maps. In: CVPR (2019).

Chenyi Chen, Ari Seff, Alain Kornhauser, and Jianxiong Xiao. DeepDriving: Learning Affordance for Direct Perception in Autonomous Driving. In ICCV, 2015.

Chen, K., Gao, J., Nevatia, R.: Knowledge aided consistency for weakly supervised phrase grounding. In: Proceedings of the IEEE Conference on Computer Vision and Pattern Recognition. pp. 4042-4050 (2018).

Chen, Z., Ma, L., Luo, W., Wong, K.Y.K.: Weakly-supervised spatio-temporally grounding natural sentence in video. In: ACL (2019).

Choi, W., Shahid, K., Savarese, S.: What are they doing?: Collective activity classification using spatio-temporal relationship among

(56) References Cited

OTHER PUBLICATIONS people. In: 2009 IEEE 12th international conference on computer vision workshops, ICCV Workshops. pp. 1282-1289. IEEE (2009).
Cordts, M., Omran, M., Ramos, S., Rehfeld, T., Enzweiler, M., Benenson, R., Franke, U., Roth, S., Schiele, B.: The Cityscapes Dataset for Semantic Urban Scene Understanding. In: CVPR (2016).
Ćorović, A., Ilić, V., urić, S., Marijan, M., Pavković, B.: The real-time detection of traffic participants using yolo algorithm. In: 2018 26th Telecommunications Forum (TELFOR). pp. 1-4. IEEE (2018).
Datta, S., Sikka, K., Roy, A., Ahuja, K., Parikh, D., Divakaran, A.: Align2ground: Weakly supervised phrase grounding guided by image-caption alignment. In: Proceedings of the IEEE/CVF International Conference on Computer Vision. pp. 2601-2610 (2019).
Feichtenhofer, C., Fan, H., Malik, J., He, K.: Slowfast networks for video recognition. In: Proceedings of the IEEE/CVF International conference on computer vision. pp. 6202-6211 (2019).
Gao, M., Tawari, A., Martin, S.: Goal-oriented Object Importance Estimation in On-road Driving Videos. In: IROS (2019).
Andreas Geiger, Martin Lauer, Christian Wojek, Christoph Stiller, and Raquel Urtasun. 3D Traffic Scene Understanding from Movable Platforms. IEEE Transactions on Pattern Analysis and Machine Intelligence, 36:5, 2014.
Geiger, A., Lenz, P., Urtasun, R.: Are we ready for Autonomous Driving? The KITTI Vision Benchmark Suite. In: CVPR (2012).
Girase, H., Gang, H., Malla, S., Li, J., Kanehara, A., Mangalam, K., Choi, C.: Loki: Long term and key intentions for trajectory prediction. In: Proceedings of the IEEE/CVF International Conference on Computer Vision. pp. 9803-9812 (2021).
Girdhar, R., Carreira, J., Doersch, C., Zisserman, A.: Video Action Transformer Network. In: CVPR (2019).
Gupta, T., Vahdat, A., Chechik, G., Yang, X., Kautz, J., Hoiem, D.: Contrastive learning for weakly supervised phrase grounding. In: Computer Vision-ECCV 2020: 16th European Conference, Glasgow, UK, Aug. 23-28, 2020, Proceedings, Part III 16. pp. 752-768. Springer (2020).
He, K., Gkioxari, G., Dollár, P., Girshick, R.: Mask R-CNN. In: ICCV (2017).
Herzig, R., Levi, E., Xu, H., Gao, H., Brosh, E., Wang, X., Globerson, A., Darrell, T.: Spatio-Temporal Action Graph Networks. In: ICCVW (2019).
Hornauer, S., Yellapragada, B., Ranjbar, A., Yu, S.X.: Driving Scene-Retrieval by Example from Large-Scale Data. In: CVPRW (2019).
Hu, A., Murez, Z., Mohan, N., Dudas, S., Hawke, J., Badrinarayanan, V., Cipolla, R., Kendall, A.: FIERY: Future Instance Prediction in Bird's-Eye View from Surround Monocular Cameras. In: ICCV (2021).
Huang, D.A., Buch, S., Dery, L., Garg, A., Fei-Fei, L., Niebles, J.C.: Finding"it": Weaklysupervised reference-aware visual grounding in instructional videos. In: Proceedings of the IEEE Conference on Computer Vision and Pattern Recognition. pp. 5948-5957 (2018).
Xinyu Huang, Xinjing Cheng, Qichuan Geng, Binbin Cao, Dingfu Zhou, Peng Wang, Yuanquing Lin, and Ruigang Yang: The ApolloScape Open Dataset for Autonomous Driving and its Application. In: CVPR (2018).
Hussein, N., Gavves, E., Smeulders, A.W.: Timeception for Complex Action Recognitions. In: CVPR (2019).
Idrees, H., Zamir, A.R., Jiang, Y.G., Gorban, A., Laptev, I., Sukthankar, R., Shah, M.: The thumos challenge on action recognition for videos "in the wild". Computer Vision and Image Understanding 155, 1-23 (2017).
Kesten, R., Usman, M., Houston, J., Pandya, T., Nadhamuni, K., Ferreira, A., Yuan, M., Low, B., Jain, A., Ondruska, P., Omari, S., Shah, S., Kulkami, A., Kazakova, A., Tao, C., Platinsky, L., Jiang, W., Shet, V.: Level 5 perception dataset 2020. https://level-5.global/level5/data/ (2019).

Kim, J., Misu, T., Chen, Y.T., Tawari, A., Canny, J.F.: Grounding Human-To-Vehicle Advice for Self-Driving Vehicles. In: CVPR (2019).
Kim, J., Rohrbach, A., Darrell, T., Canny, J.F., Akata, Z.: Textual Explanations for Self-Driving Vehicles. In: ECCV (2018).
Kipf, T.N., Welling, M.: Semi-supervised classification with graph convolutional networks. arXiv preprint arXiv:1609.02907 (2016).
Kosaraju, V., Sadeghian, A., Martin-Martin, R., Reid, I., Rezatofighi, S.H., Savarese, S.: Social-bigat: Multimodal trajectory forecasting using bicycle-gan and graph attention networks. arXiv preprint arXiv:1907.03395 (2019).
Lefevre, S., Vasquez, D., Laugier, C.: A Survey on Motion Prediction and Risk Assessment for Intelligent Vehicles. ROBOMECH Journal 1, 1 (2014).
Li, C., Chan, S.H., Chen, Y.T.: Who Make Drivers Stop? Towards Driver-centric Risk Assessment: Risk Object Identification via Causal Inference. IROS (2020).
Li, C., Meng, Y., Chan, S.H., Chen, Y.T.: Learning 3D-aware Egocentric Spatial-Temporal Interaction via Graph Convolutional Networks. In: ICRA (2020).
Li, M.G., Bo Jiang, Z.C., Shi, X., Liu, M., Meng, Y., Ye, J., Liu, Y.: DBUS: Human Driving Behavior Understanding System. In: ICCVW (2018).
Lin, D., Fidler, S., Kong, C., Urtasun, R.: Visual Semantic Search: Retrieving Videos via Complex Textual Queries. In: CVPR (2014).
Lin, S.C., Hsu, C.H., Talamonti, W., Zhang, Y., Oney, S., Mars, J., Tang, L.: Adasa: A conversational in-vehicle digital assistant for advanced driver assistance features. In: Proceedings of the 31st Annual ACM Symposium on User Interface Software and Technology. pp. 531-542 (2018).
Lin, T.Y., Maire, M., Belongie, S., Hays, J., Perona, P., Ramanan, D., Dollar, P., Zitnick, C.L.: Microsoft COCO: Common Objects in Context. In: ECCV (2014).
Lin, Y.L., Tran, S., Davis, L.S.: Fashion outfit complementary item retrieval. In: Proceedings of the IEEE/CVF Conference on Computer Vision and Pattern Recognition. pp. 3311-3319 (2020).
Liu, B., Adeli, E., Cao, Z., Lee, K.H., Shenoi, A., Gaidon, A., Niebles, J.C.: Spatiotemporal relationship reasoning for pedestrian intent prediction. IEEE Robotics and Automation Letters 5(2), 3485-3492 (2020).
Maddern, W., Pascoe, G., Linegar, C., Newman, P.: 1 Year, 1000km: The Oxford RobotCar Dataset. The International Journal of Robotics Research (IJRR) 36(1), 3-15 (2017).
Malla, S., Dariush, B., Choi, C.: TITAN: Future Forecast using Action Priors. In: CVPR (2020).
Mao, J., Huang, J., Toshev, A., Camburu, O., Yuille, A.L., Murphy, K.: Generation and comprehension of unambiguous object descriptions. In: Proceedings of the IEEE conference on computer vision and pattern recognition. pp. 11-20 (2016).
Materzynska, R., Xiao, T., Herzig, R., Xu, H., Wang, X., Darrell, T.: Something-Else: Compositional Action Recognition with Spatial-Temporal Interaction Networks. In: CVPR (2019).
Michalke, T., Kastner, R.: The attentive co-pilot: Towards a proactive biologically-inspired advanced driver assistance system. IEEE Intelligent Transportation Systems Magazine 3(3), 6-23 (2011).
Mohamed, A., Qian, K., Elhoseiny, M., Claudel, C.: Social-stgcnn: A social spatio-temporal graph convolutional neural network for human trajectory prediction. In: Proceedings of the IEEE/CVF Conference on Computer Vision and Pattern Recognition. pp. 14424-14432 (2020).
Nagarajan, T., Li, Y., Feichtenhofer, C., Grauman, K.: EGO-TOPO: Environment Affordances from Egocentric Video. In: CVPR (2020).
Naphade, M., Wang, S., Anastasiu, D.C., Tang, Z., Chang, M.C., Yang, X., Yao, Y., Zheng, L., Chakraborty, P., Lopez, C.E., Sharma, A., Feng, Q., Ablavsky, V., Sclaroff, S.: The 5th AI City Challenge. In: CVPRW (2021).
Naphade, M., Wang, S., Anastasiu, D.C., Tang, Z., Chang, M.C., Yang, X., Zheng, L., Sharma, A., Chellappa, R., Chakraborty, P.: The 4th ai city challenge. In: CVPRW (2020).

\* cited by examiner

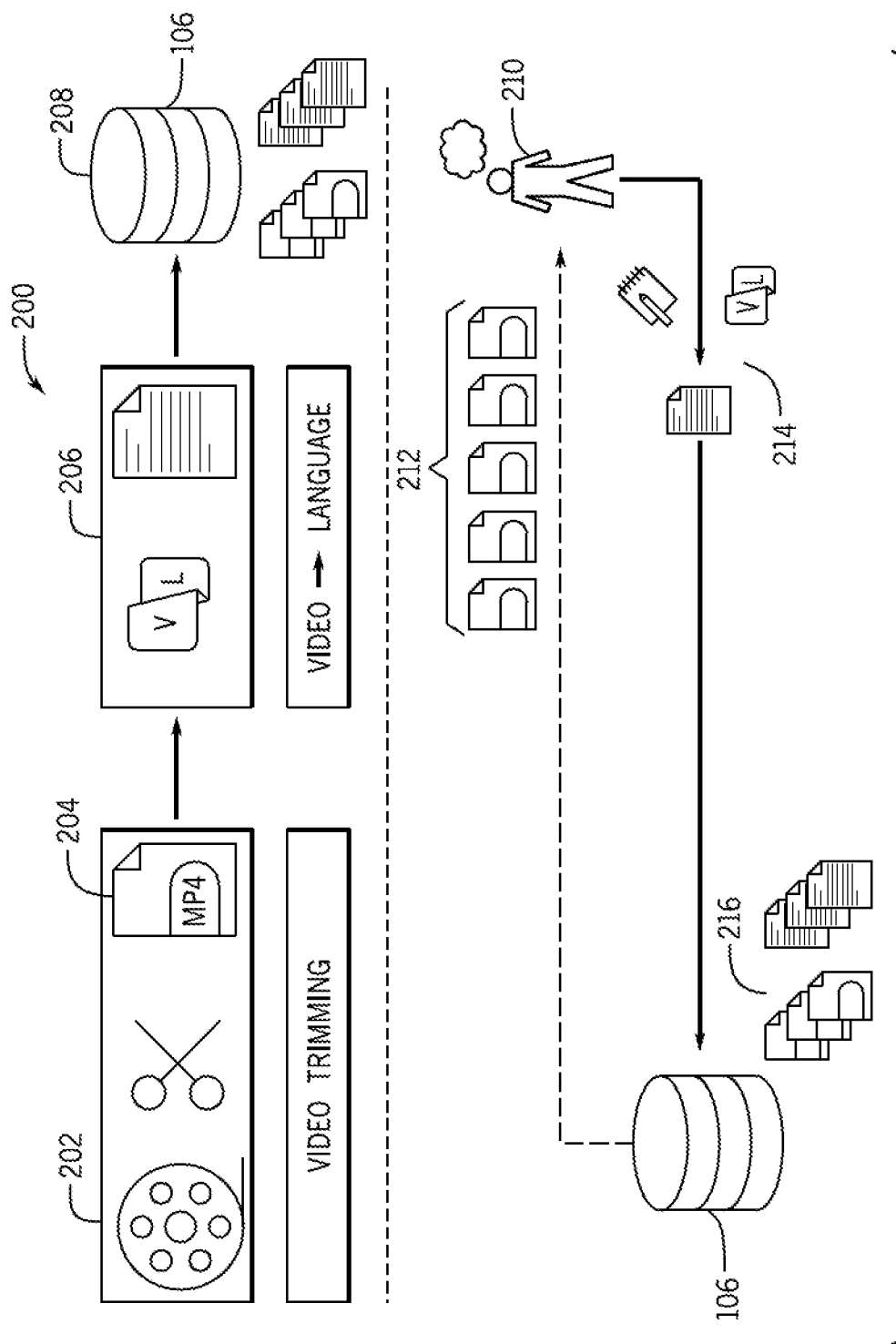

308

| Action Units | # |
|---|---|
| E:Z1-Z3 | 648 |
| C:Z3-Z1 | 560 |
| C:Z2-Z4 | 495 |
| C:Z4-Z2 | 466 |
| C:Z1-Z3 | 347 |
| E:Z1-Z2 | 258 |
| E:Z1-Z4 | 331 |
| C:Z3-Z4 | 221 |
| C:Z4-Z3 | 207 |
| P:C2-C3 | 198 |
| P:C3-C2 | 188 |
| P:C2-C1 | 181 |
| P:C3-C4 | 167 |
| P:C1-C2 | 166 |
| C:Z2-Z1 | 161 |
| P:C1-C4 | 160 |
| P:C4-C1 | 156 |
| C:Z2-Z3 | 153 |
| C:Z3-Z2 | 140 |
| P:C4-C3 | 128 |
| C:Z1-Z4 | 123 |
| C:Z4-Z1 | 112 |
| P+:C2-C1 | 106 |
| P+:C1-C4 | 104 |
| P+:C3-C4 | 104 |
| P+:C2-C3 | 98 |
| C:Z1-Z2 | 97 |
| P+:C3-C2 | 96 |
| P+:C1-C2 | 89 |
| P+:C4-C3 | 85 |

| Action Units | # |
|---|---|
| P+:C4-C1 | 47 |
| C+:Z3-Z1 | 35 |
| K:Z2-Z4 | 31 |
| K:Z3-Z1 | 30 |
| C+:Z2-Z4 | 23 |
| K:Z4-Z2 | 23 |
| K:Z1-Z3 | 21 |
| C+:Z4-Z2 | 15 |
| C+:Z1-Z3 | 14 |
| K:Z3-Z2 | 11 |
| K:Z4-Z3 | 7 |
| C+:Z1-Z2 | 4 |
| K:Z3-Z4 | 4 |
| C+:Z3-Z4 | 4 |
| C+:Z2-Z3 | 4 |
| K+:Z1-Z2 | 4 |
| C+:Z2-Z1 | 3 |
| K+:Z2-Z3 | 3 |
| C+:Z4-Z3 | 3 |
| K:Z2-Z3 | 2 |
| C+:Z3-Z2 | 2 |
| K:Z4-Z1 | 2 |
| K:Z1-Z4 | 2 |
| K+:Z3-Z1 | 2 |
| K+:Z2-Z4 | 2 |
| K+:Z1-Z2 | 1 |
| C+:Z4-Z1 | 1 |
| C+:Z1-Z4 | 1 |
| K+:Z4-Z1 | 1 |

312

| Motion (Verbs) | # |
|---|---|
| Z1-Z3 | 1030 |
| Z3-Z1 | 627 |
| Z2-Z4 | 551 |
| Z4-Z2 | 504 |
| Z1-Z4 | 457 |
| Z1-Z2 | 364 |
| C2-C3 | 296 |
| C2-C1 | 287 |
| C3-C2 | 284 |
| C3-C4 | 271 |
| C1-C4 | 264 |
| C1-C2 | 255 |
| Z3-Z4 | 229 |
| Z4-Z3 | 217 |
| C4-C3 | 213 |
| C4-C1 | 203 |
| Z2-Z1 | 164 |
| Z2-Z3 | 162 |
| Z3-Z2 | 153 |
| Z4-Z1 | 116 |

310

| Agent Types (Nouns) | # |
|---|---|
| P | 1344 |
| C | 3082 |
| K | 137 |
| P+ | 728 |
| C+ | 109 |
| K+ | 9 |
| E | 1243 |

| Type of Scenario | # |
|---|---|
| 4W4S | 989 |
| 4WUT | 90 |
| 4WPT | 14 |
| 4W2S | 9 |

FIG. 3C

DRIVING SCENARIO UNDERSTANDING

BACKGROUND

In computer image analysis, a common task is to classify and label objects and object motions in a captured video. Most existing systems take a finite set of object labels, which are learned offline from training data. This may be inefficient and computationally expensive.

BRIEF DESCRIPTION

According to one aspect, a system for intersection scenario description may include a processor and a memory. The memory may store one or more instructions which, when executed by the processor cause the processor to perform one or more acts, actions, or steps, including receiving a video stream of a surrounding environment of an ego-vehicle, extracting tracklets and appearance features associated with one or more dynamic objects from the surrounding environment, extracting motion features associated with one or more dynamic objects from the surrounding environment based on the corresponding tracklets, passing the appearance features through an appearance neural network to generate an appearance model, passing the motion features through a motion neural network to generate a motion model, passing the appearance model and the motion model through a fusion network to generate a fusion output, passing the fusion output through a classifier to generate a classifier output, and passing the classifier output through a loss function to generate a multi-label classification output associated with the ego-vehicle, one or more of the dynamic objects, and one or more corresponding motion paths.

Weakly supervised phrase grounding may be performed by converting a last fully connected layer of the fusion network and a last fully connected layer of the classifier as a set of weights between a number of nodes from the appearance neural network and the motion neural network and a total number of classes from the loss function. The loss function may be a binary cross entropy (BCE) loss function. The appearance features may be extracted using an Inception v3 convolutional neural network (CNN) and region of interest align (RoIAlign). Each node of the appearance neural network and the motion neural network may represent one of the one or more dynamic objects. The multi-label classification output may include annotations for the ego-vehicle, dynamic objects, and corresponding motion paths using action units that describe an intersection scenario. The action units may include action unit nouns that describe the ego-vehicle and the dynamic objects and action unit verbs that describe respective motion paths of the ego-vehicle and the dynamic objects within the intersection scene. The processor may retrieve one or more intersection scenarios based on a query of an electronic dataset that stores a combination of action units. The processor may retrieve one or more of the intersection scenarios based on a hamming distance between predicted binary labels for the intersection scenario and ground truth labels. The processor may convert predicted binary labels for the intersection scenario into dictionaries. The processor may build a database for training neural networks based on parameters associated the query.

According to one aspect, a computer-implemented method for intersection scenario description may include receiving a video stream of a surrounding environment of an ego-vehicle, extracting tracklets and appearance features associated with one or more dynamic objects from the surrounding environment, extracting motion features associated with one or more dynamic objects from the surrounding environment based on the corresponding tracklets, passing the appearance features through an appearance neural network to generate an appearance model, passing the motion features through a motion neural network to generate a motion model, passing the appearance model and the motion model through a fusion network to generate a fusion output, passing the fusion output through a classifier to generate a classifier output, and passing the classifier output through a loss function to generate a multi-label classification output indicative of the ego-vehicle, one or more of the dynamic objects, and one or more corresponding motion paths.

The computer-implemented for intersection scenario description may include performing weakly supervised phrase grounding by converting a last fully connected layer of the fusion network and a last fully connected layer of the classifier as a set of weights between a number of nodes from the appearance neural network and the motion neural network and a total number of classes from the loss function. The loss function may be a binary cross entropy (BCE) loss function. The appearance features may be extracted using an Inception v3 convolutional neural network (CNN) and region of interest align (RoIAlign). Each node of the appearance neural network and the motion neural network may represent one of the one or more dynamic objects. The multi-label classification output may include annotations for the ego-vehicle, dynamic objects, and corresponding motion paths using action units that describe an intersection scenario. The action units may include action unit nouns that describe the ego-vehicle and the dynamic objects and action unit verbs that describe respective motion paths of the ego-vehicle and the dynamic objects within the intersection scene.

According to one aspect, a system for intersection scenario description may include a processor and a memory. The memory may store one or more instructions which, when executed by the processor cause the processor to perform one or more acts, actions, or steps including receiving a video stream of a surrounding environment of an ego-vehicle, extracting tracklets and appearance features associated with one or more dynamic objects from the surrounding environment, extracting motion features associated with one or more dynamic objects from the surrounding environment based on the corresponding tracklets, passing the appearance features through an appearance neural network to generate an appearance model, passing the motion features through a motion neural network to generate a motion model, passing the appearance model and the motion model through a fusion network to generate a fusion output, passing the fusion output through a classifier to generate a classifier output, and passing the classifier output through a loss function to generate a multi-label classification output indicative of the ego-vehicle, one or more of the dynamic objects, and one or more corresponding motion paths. During weakly supervised phrase grounding, a last fully connected layer of the fusion network and a last fully connected layer of the classifier may include a set of weights between a number of nodes from the appearance neural network and the motion neural network and a total number of classes from the loss function.

The loss function may be a binary cross entropy (BCE) loss function. The appearance features may be extracted using an Inception v3 convolutional neural network (CNN) and region of interest align (RoIAlign). Each node of the appearance neural network and the motion neural network may represent one of the one or more dynamic objects.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 2 is a general framework of an operation of the intersection scenario application, according to one aspect.

FIG. 3C is an illustrative example of a dataset of action units that are associated with a plurality of intersection scenes as intersection scenarios, according to one aspect.

DETAILED DESCRIPTION

Figure 1:
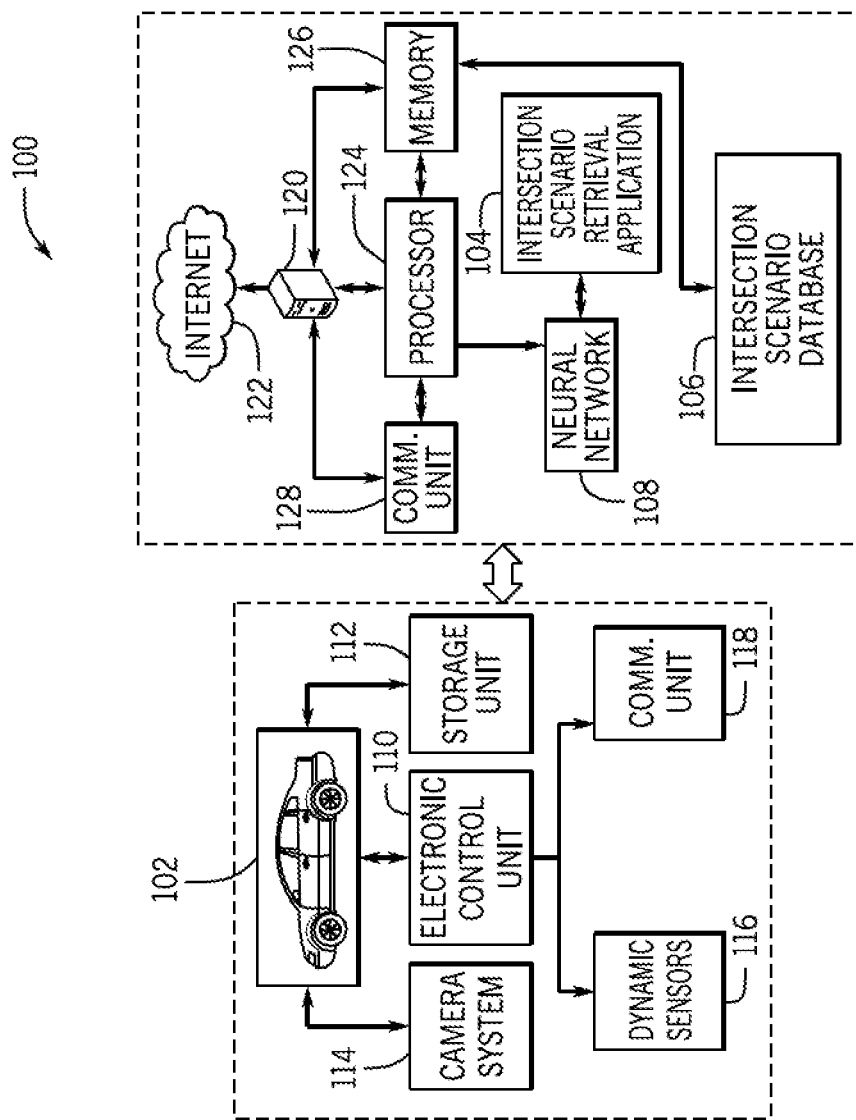
FIG. 1 is a schematic view of an exemplary system for performing intersection scenario retrieval, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

A "vehicle system", as used herein, may be any automatic or manual systems that may be used to enhance the vehicle, and/or driving. Exemplary vehicle systems include an autonomous driving system, a heads-up display, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

I. System Overview

Referring now to the drawings, wherein the showings are for purposes of illustrating one or more aspects and not for purposes of limiting the same, FIG. 1 is a schematic view of an exemplary system 100 for performing intersection scenario retrieval, according to one aspect. The components of the system 100, as well as the components of other systems, hardware architectures, and software architectures discussed herein, may be combined, omitted, or organized into different architectures for various aspects.

Generally, the system 100 may include an ego-vehicle 102. The ego-vehicle 102 may include, but is not limited to, an automobile, a robot, a forklift, a bicycle/motor bike, a wheel chair/scooter, a construction crane, an airplane, an autonomous vehicle, and the like that may be travelling within one or more types of environments. For ease of description, this disclosure will describe the aspects of the system 100 with respect to an ego-vehicle 102 as a passenger vehicle (e.g., car).

According to one aspect, the system 100 may include an intersection scenario application 104. With reference to FIG. 2, a general framework 200 of the operation of the intersection scenario application 104 is provided. The intersection scenario application 104 may be configured to receive one or more video streams 202 of a surrounding environment of the ego-vehicle 102 (e.g., roadway environment or operating environment through which the ego-vehicle 102 is travelling). The intersection scenario application 104 may be further configured to analyze video from the one or more video streams 202 and/or dynamic data associated with the dynamic operation of the ego-vehicle 102 to determine one or more portions of the one or more video streams 202 that include action priors that are associated with intersection scenes. The intersection scenario application 104 may be configured to electronically trim the one or more portions as video clips 204 that include action priors associated with various types of roadway intersections that are captured within the video streams 202 as intersection scenes.

More specifically, the one or more video clips 204 may be trimmed from portions of respective video streams 202 that include captured egocentric video of the surrounding environment of the ego-vehicle 102 as the ego-vehicle 102 approaches, enters, passes through, and exits intersection scenes or environments (e.g., that include roadway intersections). The one or more video clips 204 that include action priors pertaining to intersection scenes may include dynamic objects. Examples of dynamic objects may include, but are not limited to additional vehicles or other vehicles travelling within the intersection scenes, pedestrians travelling within the intersection scenes, and/or cyclists (e.g., bicyclists/motorcyclists) travelling within the intersection scenes. These additional vehicles, pedestrians, cyclists, bicyclists, motorcyclists, etc. may be referred to as agents or actors within the intersection scene. In addition to the dynamic objects, the action priors pertain to the motion of each of the dynamic objects within the intersection scenes included within each of the video clips 204 during a timeframe in which the ego-vehicle 102 is approaching, entering, passing through, and exiting each respective intersection scene. Such motion of the dynamic objects may include, but are not limited to, stopping motions, turning motions, crossing motions, and the like.

According to one aspect, the intersection scenario application 104 may be configured to utilize a neural network 108 and/or a framework to analyze the action priors included within video clips 204 of the intersection scenes in addition to the dynamic operation of the ego-vehicle 102 to thereby annotate 206 the objects and motion paths of the ego-vehicle 102 and the dynamic objects with respect to their respective descriptions and their travelling maneuvers within each intersection scene as action units. As discussed in greater detail below, the action units may be combined to form the video true traffic language to succinctly and distinctly describe intersection scenarios of each of the respective intersection scenes in noun-verb combinations that pertain to the ego-vehicle 102 and the one or more dynamic objects included within each respective intersection scene and their respective motion pathways within each intersection scene. Action unit nouns of the video true traffic language may describe the ego-vehicle 102 and one or more dynamic objects that are located within each intersection scene. Examples of dynamic objects described may include a car, a group of vehicles, a pedestrian, a group of pedestrians, a cyclist (bicyclist, motorcyclist), a group of cyclists, and the like. Additional contemplated dynamic objects that are not explicitly discussed herein may be described by action unit nouns.

The video true traffic language may also include action unit verbs combined with the action unit nouns. The action unit verbs are directed towards the ego-vehicle's motion path (e.g., path of travel) within the intersection scenes and each respective dynamic object's respective motion paths within intersection scenes. Accordingly, the action unit verbs may be combined with the action unit nouns describing the respective motion paths of the ego-vehicle 102 and the dynamic objects (e.g., ego-vehicle, car, pedestrian, cyclist) within each respective intersection scene included within each of the video clips 204. Accordingly, the action units may include rich spatial information regarding each of the intersection scenes in order to describe the ego-vehicle 102, the dynamic objects, and their respective motion paths within the respective intersection scenes to help conceptualize three-dimensional relationships of the ego-vehicle 102 and the dynamic objects included within intersection scenes in space as a succession of transformations over a period of time.

According to one aspect, upon annotating the ego-vehicle 102, the dynamic objects, and their respective motion paths included within each of respective intersection scene with respective action units, the intersection scenario application 104 may be configured to combine respective action units associated with particular objects (e.g., ego-vehicle 102, vehicles, pedestrians, cyclists) to their respective motion paths (e.g., turning, stopping, accelerating, crossing).

The intersection scenario application 104 may be further configured to store a dataset of combined action units that are associated with a plurality of intersection scenes. The combined action units may be classified as intersection scenarios and linked with previously captured video clips 204 of the intersection scenes that include the ego-vehicle 102 and one or more types of dynamic objects completing one or more types of motion paths (e.g., left turn, right turn, travelling straight through the intersection).

The intersection scenarios may be stored 208 upon an intersection scenario database 106 as a dataset of combined action units that are associated with a plurality of intersection scenes. According to one aspect, in a search mode of the intersection scenario application 104, the intersection scenario application 104 may provide a user 210 with the ability to retrieve one or more intersection scenario video clips 212 that are associated with a particular intersection scenario based on an input of object and motion search inputs 214 that are provided by the user 210.

The intersection scenario application 104 may be configured to query 216 the intersection scenario database 106 with one or more combinations of action units to retrieve records of respective action units that may be stored upon the intersection scenario database 106. Accordingly, the intersection scenario application 104 may be configured to operably control a graphical user interface provided through one or more display screens (not shown) to present one or more linked stored intersection scenario video clips 212 of one or more intersection scenarios that fulfill the query 216 of the combinations of action units.

With reference to FIG. 1, the ego-vehicle 102 may include an electronic control device (ECU) 110 that operably controls a plurality of components of the ego-vehicle 102. The ECU 110 may be configured to execute one or more applications, one or more operating systems, one or more vehicle system and subsystem executable instructions, among others. According to one aspect, the ECU 110 may include a respective microprocessor, one or more application-specific integrated circuit(s) (ASIC), or other similar devices. The ECU 110 may also include a respective internal processing memory, an interface circuit, and bus lines for transferring data, sending commands, and communicating with the plurality of components of the ego-vehicle 102.

The ECU 110 may also include a respective communication device (not shown) for sending data internally to components of the ego-vehicle 102 and communicating with externally hosted computing systems (e.g., external to the ego-vehicle 102. Generally, the ECU 110 may communicate with a storage unit 112 to execute the one or more applications, operating systems, vehicle systems and subsystem user interfaces, and the like that are stored upon the storage unit 112. The storage unit 112 of the ego-vehicle 102 may also be configured to store one or more executable files associated with one or more operating systems, applications, associated operating system data, application data, vehicle system and subsystem user interface data, and the like that are executed by the ECU 110.

According to one aspect, the storage unit 112 may be accessed by the intersection scenario application 104 to store data, for example, one or more video streams 202 and/or vehicle dynamic data associated with the ego-vehicle 102. As discussed below, such data may be utilized to trim video clips 204 of respective videos streams 202 that include action priors including dynamic objects and the respective motions of the dynamic objects within respective intersection scenes.

According to one aspect, the ECU 110 may be additionally configured to operably control a camera system 114 of the ego-vehicle 102. The camera system 114 may include one or more cameras, image capture devices, image capture sensors, etc. that are positioned at one or more exterior portions of the ego-vehicle 102. The one or more cameras of the camera system 114 may be positioned in a direction to capture an egocentric view of the surrounding environment of the ego-vehicle 102. In other words, the one or more cameras may be positioned in a direction to capture a predetermined area located around (e.g., front and sides) of the ego-vehicle 102 as the ego-vehicle 102 travels through the surrounding environment.

In one or more configurations, the one or more cameras of the camera system 114 may be disposed at an external front, rear, and/or side portions of the ego-vehicle 102 including, but not limited to different portions of the bumpers, lighting units, fenders/body panels, and/or windshields. The one or more cameras may be positioned on a respective planar sweep pedestal (not shown) that allows the one or more cameras to be oscillated to capture video of the surrounding environment of the ego-vehicle 102. Accordingly, when the ego-vehicle 102 travels through one or more intersections, the one or more cameras are configured to capture a full/panned egocentric view of all of the streets of the intersections included within the surrounding environment of the ego-vehicle 102.

According to one aspect, the intersection scenario application 104 may be configured to receive video streams 202 of untrimmed video from the camera system 114. The video streams 202 may include egocentric views of the surrounding environment of the ego-vehicle 102 captured during a predetermined timeframe (e.g., 500 hours). As discussed below, the intersection scenario application 104 may utilize the neural network 108 and/or the framework 600 of FIG. 6 to execute image logic to analyze the video streams 202 of the surrounding environment of the ego-vehicle 102 during the predetermined timeframe to determine one or more intersection scenes that are included within the video streams 202. As discussed, the video streams 202 may be trimmed to video clips 204 and the video clips 204 may be analyzed to annotate the intersection scenes with the video true traffic language that uses action unit nouns that are directed towards describing the dynamic objects and action unit verbs that are directed towards each dynamic object's respective motion path within the intersection scenes included within the video clips 204.

According to one aspect, the ECU 110 may also be operably connected to dynamic sensors 116 of the ego-vehicle 102. The dynamic sensors 116 may be configured to output sensed dynamic data associated with the ego-vehicle 102. According to one aspect, the dynamic sensors 116 may be configured to receive inputs from one or more vehicle systems, sub-systems, control systems, and the like. The dynamic sensors 116 may be included as part of a Controller Area Network (CAN) of the ego-vehicle 102 and may be configured to provide vehicle dynamic data to the ECU 110 to be utilized for one or more vehicle systems, sub-systems, control systems, and the like.

The dynamic sensors 116 may include, but are not limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like. According to one aspect, the dynamic sensors 116 may output sensed dynamic data that may include data associated with the dynamic operation of the ego-vehicle 102 that is captured at concurrent or synchronized time stamps as respective video streams that are captured by the one or more cameras of the camera system 114.

According to one aspect, the intersection scenario application 104 may be configured to receive the sensed dynamic data from the dynamic sensors 116. The intersection scenario application 104 may be configured to utilize the neural network 108 and/or the framework 600 of FIG. 6 to execute sensor logic to determine one or more dynamic actions that may be associated with dynamic operations of the ego-vehicle 102 at instances when the ego-vehicle 102 approaches, enters, passes through, and/or exits each intersection scene included within the video stream 202. Examples of one or more dynamic actions may include, but are not limited to, braking at one or more predetermined braking rates, stopping for one or more predetermined periods of time, steering at one or more steering angles that may indicate merging and/or turning right/left, accelerating after a braking event, and the like. In other words, the dynamic data associated with the dynamic operation of the ego-vehicle 102 may be analyzed by the intersection scenario application 104 to determine instances when the ego-vehicle 102 approaches, enters, passes through, and/or exits intersection scenes.

As discussed below, upon the neural network 108 determining one or more dynamic actions that may be associated with dynamic operations of the ego-vehicle 102 when the ego-vehicle approaches, enters, passes through, and/or exits each intersection scene, the intersection scenario application 104 may determine portions of the video streams 202 of the surrounding environment of the ego-vehicle 102 that include the one or more dynamic actions that were concurrently sensed by the dynamic sensors 116. The intersection scenario application 104 may thereby trim the video streams 202 to include the respective portions of the video streams to include intersection scenes that are determined based on the dynamic data of the dynamic sensors 116. The video clips 204 of the intersection scenes may be further analyzed to annotate the ego-vehicle 102, one or more dynamic objects, and their respective motion paths within the intersection scenes with the video true traffic language.

With particular reference to the video true traffic language, according to one aspect, the action unit nouns of the video true traffic language may include, but are not limited to, E to indicate the ego-vehicle 102 travelling within the intersection scene, C to indicate a car (e.g., another vehicle) travelling within the intersection scene, C+ to indicate a group of vehicles travelling within the intersection scene, P to indicate a pedestrian travelling within the intersection scene, P+ to indicate a group of pedestrians travelling within the intersection scene, K to indicate a bicyclist travelling within the intersection scene, and K+ to indicate a group of bicyclists travelling within the intersection scene.

According to one aspect, the one or more dynamic actions of the ego-vehicle 102 at each respective intersection scene may be utilized to annotate motions associated with the ego-vehicle 102 as action unit verbs of the video true traffic language. The intersection scenario application 104 may analyze the one or more dynamic actions of the ego-vehicle 102 as the ego-vehicle 102 approaches, enters, passes through, and exits each respective intersection scene such as turning, merging, travelling straight, and the like to annotate the motion paths of the ego-vehicle 102 that pertain to a starting point and ending point of a path of travel of the ego-vehicle 102 within each respective intersection scene. Accordingly, the ego-vehicle's dynamic actions within the intersection scene may be described by action units that are included as action unit verbs that are combined with the action unit noun CE' describing the ego-vehicle 102 as a subject object. Similarly, the dynamic objects (C, C+, P, P+, K, K+) that have been annotated with action unit nouns may also be combined with action unit verbs that pertain the motion paths of the respective dynamic objects. The motion paths may be indicated by a starting point and ending point of a path of travel for each dynamic object within each respective intersection scene.

Figure 3A:
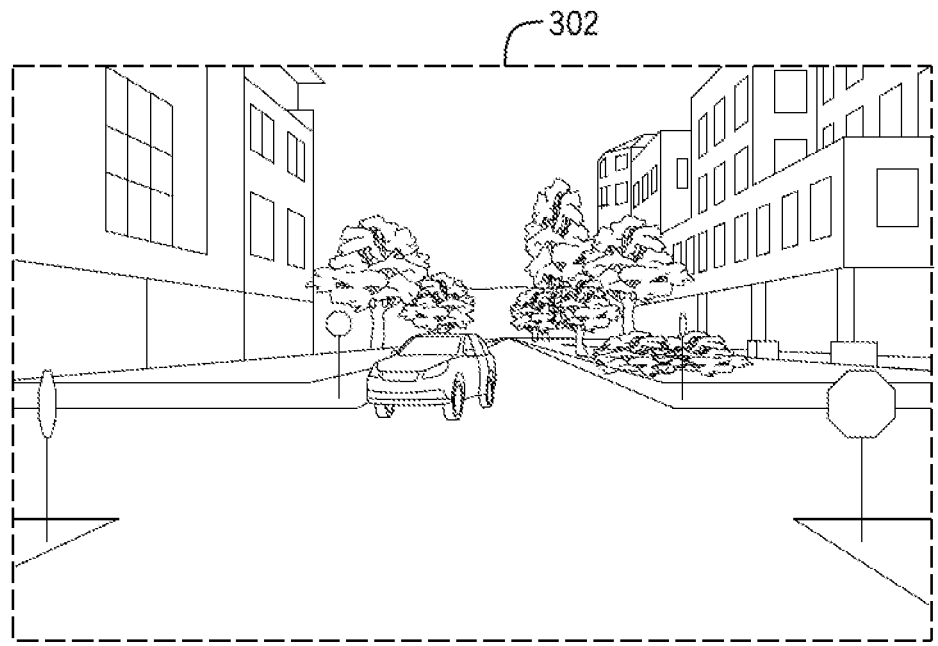
FIG. 3A is an illustrative example of an intersection scene that may be included within a video clip trimmed from a video stream, according to one aspect.
Figure 3B:
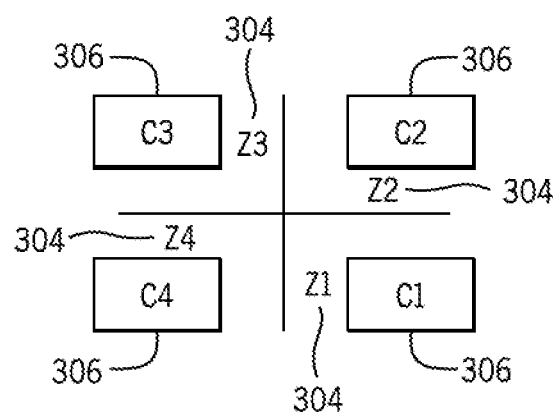
FIG. 3B is an illustrative example of a video true traffic language may pertain to zones and corners of the intersection scene, according to one aspect.

With reference to FIG. 3A, an illustrative example of an intersection scene 302 may be included within a video clip 204 that is trimmed from a video stream 202. As shown, the intersection scene 302 may be configured as a four-way roadway intersection. In FIG. 3B, the video true traffic language may define zones 304 and corners 306 of the intersection scene 302 corresponding to the intersection scene of FIG. 3A. The zones 304 may be indicated by the Z1-Z4 action units. The corners 306 may be indicated by the C1-C4 action units. In other words, the scene may be divided into four corners (i.e., C1, C2, C3, C4) and four zones (i.e., Z1, Z2, Z3, Z4). The action unit verbs may pertain to motions of the respective subject dynamic object with respect to the motion of the dynamic object through respective zones 304 and/or respective corners 306 of the intersection scene 302. The motions of the ego-vehicle 102 and the annotated dynamic objects (C, C+, P, P+, K, K+) that are included within the intersection scene 302 may be annotated with action unit verbs that pertain to the motions between the zones 304 (e.g., straight driving) and/or between the corners 306 (e.g., turning from one street to another) of the intersection scene 302.

As discussed, the action unit nouns describing the ego-vehicle 102 and the dynamic objects within the intersection scene 302 may be combined with the action unit verbs associated with the motion paths of the ego-vehicle 102 and the respective dynamic objects to describe each respective intersection scenario. Accordingly, the motion paths of the ego-vehicle 102 and the dynamic objects may be mapped according to their respective starting position to their final position within the intersection scene 302. For example, if a group of pedestrians walk from a far right corner to near a right corner on the intersection scene 302 while the ego-vehicle 102 passes the intersection scene 302 and slows down to allow a pedestrian to cross a roadway of the intersection scene 302, this scenario may be described as an intersection scenario using the annotated combined action units. Such an intersection scenario may be annotated using the video true traffic language as:

(1) P+: C1->C2
(2) P: C2->C3
(3) E: Z1->Z3

Accordingly, the action units may be combined to succinctly and distinctly describe the intersection scenario of the respective intersection scene 302 in noun-verb combinations that pertain to the ego-vehicle 102 and the dynamic objects included within each respective intersection scene 302 included within each of the video clips 204. The succinct and distinct description of the intersection scenario allows for efficient retrieval (e.g., time efficient, less processing power) of the intersection scenario during a search mode of the intersection scenario application 104.

According to one aspect, an order in which the actions occur may represent a yielding pattern. In this way, the orders of the group of pedestrians P+, the pedestrian P, and the ego-vehicle 102 may represent yielding. In this way, the ordering may ease the burden of annotation because the language may be designed at a video level, and may be highly scalable.

With reference to FIG. 1, according to one aspect, the ECU 110 of the ego-vehicle 102 may be operably connected to a communication unit 118. The communication unit 118 may be configured to connect to an internet cloud 122 to send and receive communication signals to and from an externally hosted server infrastructure or external server 120. The external server 120 may host the neural network 108 and/or the framework 600 of FIG. 6 and may execute the intersection scenario application 104 to utilize processing power to execute image logic, sensor logic, and to annotate the ego-vehicle 102, dynamic objects, and their respective motion paths that are included within intersection scenes captured within respective video clips 204 with respective action unit nouns and action unit verbs.

The external server 120 may be operably controlled by a processor 124. The processor 124 may be configured to operably control the neural network 108 and/or the framework 600 of FIG. 6 to utilize machine learning/deep learning to provide artificial intelligence capabilities that may be utilized to annotate the dynamic objects and their respective motion paths included within each respective intersection scene 302. In one configuration, the neural network 108 may be configured as a convolutional neural network (CNN) model that is trained for video classification. The neural network 108 may include graph convolutional networks (GCN), shown in FIG. 6, that may be configured to process streams of data associated with the video streams 202, video clips 204, and dynamic data provided by the dynamic sensors 116 of the ego-vehicle 102. According to another aspect, the processor may be located on the ECU 110 of the ego-vehicle 102 rather than being hosted on the external server 120.

The neural network 108 may also include one or more additional neural networks (not shown) that process data associated with the trimmed video streams. For example, the neural network 108 may include a graph convolutional network that may include an input layer to receive data associated with each dynamic object located within each intersection scene 302. Such data may be associated with the ego-vehicle 102, one or more vehicles, one or more pedestrians, and/or one or more cyclists that are travelling within each intersection scene. The graph convolutional layer may be configured to include a plurality of hidden layers that analyze vector values to thereby output a relationship between the ego-vehicle 102 and additional dynamic objects located within the intersection scenes 302 with respect to one another.

As discussed below, the neural network 108 may be configured to access a pre-trained dataset (not shown) to fuse streams of data associated with the relationships of the dynamic objects, the motions of the dynamic objects, and a context of the intersections scenes 302 to thereby annotate dynamic objects and motions that are included within respective intersection scenes 302 captured within video clips 204 with respective noun action units and verb action units. As discussed below, the intersection scenario application 104 may be configured to receive the annotated action units as combined action units that pair the ego-vehicle 102 and the dynamic objects with their respective motion paths that occur within each respective intersection scene 302.

With continued reference to the external server 120 shown in FIG. 1, the processor 124 may be operably connected to a memory 126. The memory 126 may store one or more operating systems, applications, associated operating system data, application data, executable data, and the like. The memory 126 may store one or more instructions which, when executed by the processor 124 cause the processor 124 to perform one or more acts, actions, or steps. According to one aspect, the memory 126 may store the intersection scenario database 106. According to one aspect, the intersection scenario database 106 may be configured as a relational database that includes fields that pertain to various types of intersection configurations. Such configurations may include, but are not limited to, n-way intersection scenarios (e.g., four-way intersection, three-way intersection), traffic circles, merge ramp intersections, and the like.

With reference to an illustrative example of FIG. 3C, the intersection scenario application 104 may be further configured to store a dataset 308 of action units that are associated with a plurality of intersection scenes 302 as intersection scenarios. The dataset 308 may include a subset of action unit nouns 310 that pertain to the ego-vehicle 102 and the dynamic objects travelling within each respective intersection scene 302. The dataset 308 may also include a subset of action unit verbs 312 that pertain to the respective motions of the ego-vehicle 102 and the dynamic objects included within each respective intersection scene 302. According to one aspect, respective action units of the subsets may be combined and stored upon the intersection scenario database 106 and linked with one or more video clips 204 of the respective intersection scenario associated with the combination of action units.

In particular, each of the fields of the intersection scenario database 106 may be organized based on a type of intersection configuration (e.g., four way intersection, three way intersection, etc.) and may include respective data records that pertain to intersection scenarios that pertain to the type of intersection configuration. Each of the respective data records may be populated with respective intersection scenarios that may include one or more action unit combinations that are associated with respective intersection scenes. As discussed below, during a search mode of the intersection scenario application 104, the intersection scenario application 104 may query 216 the intersection scenario database to provide the user 210 with the ability to retrieve one or more intersection scenario video clips 212 based on the input of object and motion search inputs 214 that are provided by the user 210.

According to one aspect, the memory 126 may also be configured to store a plurality of video clips 204 that are respectively associated with the intersection scenarios stored upon the intersection scenario database 106. During the search mode of the intersection scenario application 104, upon querying 216 the intersection scenario database 106 with the object and motion search inputs 214, the intersection scenario application 104 may be configured to access the memory 126 to retrieve one or more of the plurality of video clips 204 that are stored upon the memory 126. The intersection scenario application 104 may be configured to present the one or more stored video clips 204 as one or more intersection scenario video clips 212 based on combinations of action units that pertain to the object and motion search inputs 214 provided by the user 210 during the search mode of the intersection scenario application 104.

With continued reference to FIG. 1, according to one aspect, the processor 124 of the external server 120 may additionally be configured to communicate with a communication unit 128. The communication unit 128 may be configured to communicate through the internet cloud 122 through one or more wireless communication signals that may include, but are not limited to Bluetooth® signals, Wi-Fi signals, ZigBee signals, Wi-Max signals, and the like. According to one aspect, the communication unit 128 may be configured to connect to the internet cloud 122 to send and receive communication signals to and from the ego-vehicle 102. In particular, the external server 120 may receive data associated with videos captured by the one or more cameras of the camera system 114 and dynamic data captured by the dynamic sensors 116 of the ego-vehicle 102.

II. The Intersection Scenario Retrieval Application and Related Methods

The components of the intersection scenario application 104 will now be described according to one aspect and with reference to FIG. 1. According to one aspect, the intersection scenario application 104 may be stored on the memory 126 and executed by the processor 124 of the external server 120. According to another aspect, the intersection scenario application 104 may be stored on the storage unit 112 of the ego-vehicle 102 and may be executed by the ECU 110.

Figure 4:
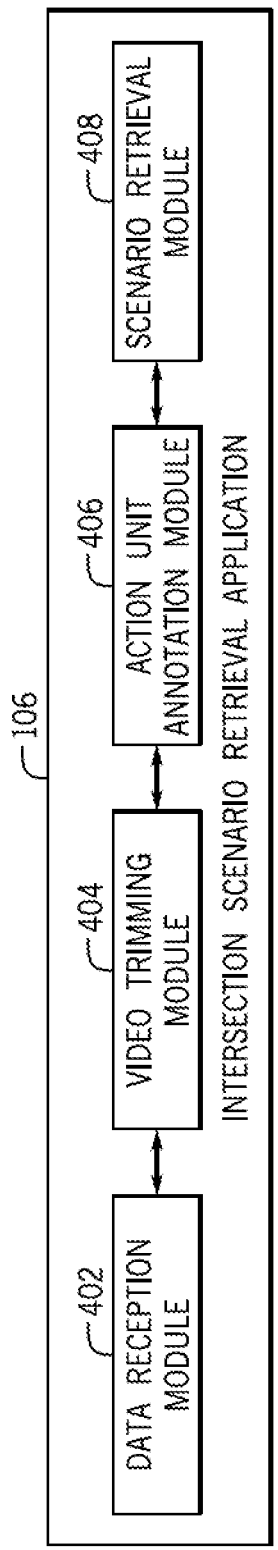
FIG. 4 is a schematic overview of a plurality of modules of the intersection scenario application that may execute computer-implemented instructions to perform intersection scenario storage and retrieval, according to one aspect.

The general functionality of the intersection scenario application 104 will now be discussed. With reference to FIG. 4, the intersection scenario application 104 may include a plurality of modules 402-408 that may execute computer-implemented instructions to perform intersection scenario storage and retrieval. The plurality of modules 402-408 may include a data reception module 402, a video trimming module 404, an action unit annotation module 406, and a scenario retrieval module 408. The intersection scenario application 104 may include one or more additional modules and/or sub-modules that are included in addition to the modules 402-408. Methods and examples describing process steps that are executed by the modules 402-408 of the intersection scenario application 104 will now be described in more detail.

Figure 5:
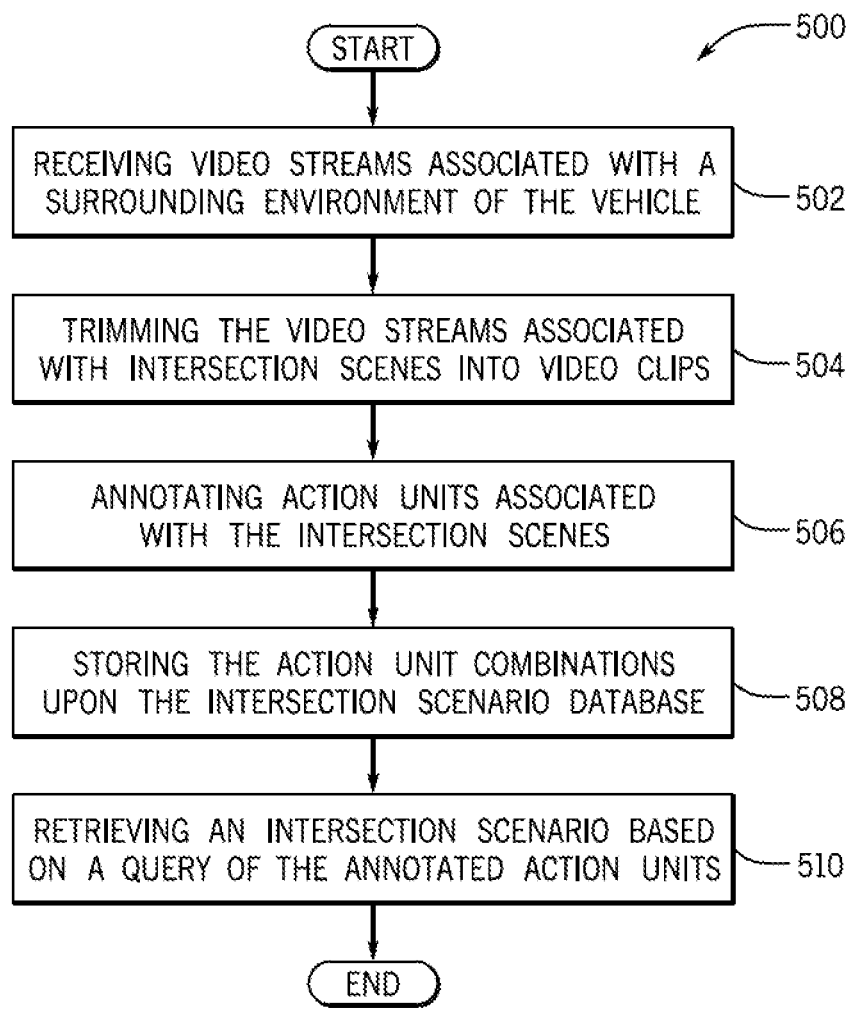
FIG. 5 is a process flow diagram of a method for annotating action units associated with intersection scenes and retrieving an intersection scenario, according to one aspect.

FIG. 5 is a process flow diagram of a method 500 for annotating action units associated with intersection scenes 302 and retrieving an intersection scenario, according to one aspect. FIG. 5 will be described with reference to the components of FIGS. 1-4, though the method 500 of FIG. 5 may be used with additional and/or alternative system components. The method 500 may begin at block 502, wherein the method 500 may include receiving video streams 202 associated with intersection scenes 302.

According to one aspect, the data reception module 402 of the intersection scenario application 104 may be configured to communicate with the camera system 114 to receive video streams 202 of the surrounding environment of the ego-vehicle 102. As discussed above, one or more cameras of the camera system 114 may be configured to capture the egocentric view of the surrounding environment of the ego-vehicle 102. The data reception module 402 may be configured to receive video streams 202 of the untrimmed video captured of a predetermined time frame of the egocentric view of the surrounding environment of the ego-vehicle 102.

The method 500 may proceed to block 504, wherein the method 500 may include trimming the video streams 202 associated with intersection scenes into video clips 204. According to one aspect, upon receiving the video streams, the data reception module 402 may communicate respective video image data associated with the video streams to the video trimming module 404 of the intersection scenario application 104. According to one aspect, the video trimming module 404 may be configured to communicate with the neural network 108 hosted upon the external server 120. The video trimming module 404 may utilize the neural network 108 to execute image logic to analyze the video image data associated with the video streams. The image logic may be based on a pre-trained image classification dataset that may be accessed by the neural network for video classification to identify intersection scenes and trim the video streams 202 into video clips 204 that include intersection scenes 302.

In particular, the neural network 108 may be configured to trim one or more video clips 204 from the video streams 202 that include action priors that pertain the surrounding environment of the ego-vehicle 102 that includes intersection scenes 302. In other words, the video clips 204 are trimmed from portions of respective video streams 202 that include captured video of ego-vehicle 102 approaching, entering, passing through, and exiting intersection scenes 302. The action priors included within the video clips 204 may include dynamic objects, that may include, may not be limited to vehicles that may be included within the intersection scenes 302, pedestrians that may be included within the intersection scenes 302, and/or cyclists (e.g., bicyclists/motorcyclists) that may be included within the intersection scenes 302. In addition to the dynamic objects, the action priors included within the video clips 204 may pertain to the motion paths of each of the dynamic objects within the intersection scenes 302 included within each of the video clips 204 during a timeframe in which the ego-vehicle 102 is approaching, entering, passing through, and exiting each respective intersection scene 302. Such motion may include, but are not limited to, stopping motions, turning motions, crossing motions, and the like.

Upon trimming the video clips 204 that include the action priors, the neural network 108 may communicate respective data associated with the video clips 204 to the video trimming module 404. The video trimming module 404 may be configured to classify the respective video clips 204 as being associated with respective types of intersection configurations. According to one aspect, the video trimming module 404 may access the memory 126 of the external server 120 to store the respective video clips 204. As discussed below, the stored video clips 204 may be associated with combinations of actions unit that are annotated and retrieved based on a query 216 of the annotated action units and presented to the user 210 as intersection scenario video clips 212.

With continued reference to FIG. 5, the method 500 may proceed to block 506, wherein the method 500 may include annotating action units associated with the intersection scenes 302. According to one aspect, upon storing the video clips 204 upon the memory 126 of the external server 120, the video trimming module 404 may communicate respective data pertaining to the storage of the video clips 204 to the action unit annotation module 406 of the intersection scenario application 104. According to one aspect, the action unit annotation module 406 may be configured to retrieve the respective video clips 204 from the memory 126 and may communicate with the dynamic sensors 116 to retrieve stored dynamic data associated with the dynamic operation of the ego-vehicle 102 that is captured at concurrent time stamps as the respective video clips 204.

Figure 6:
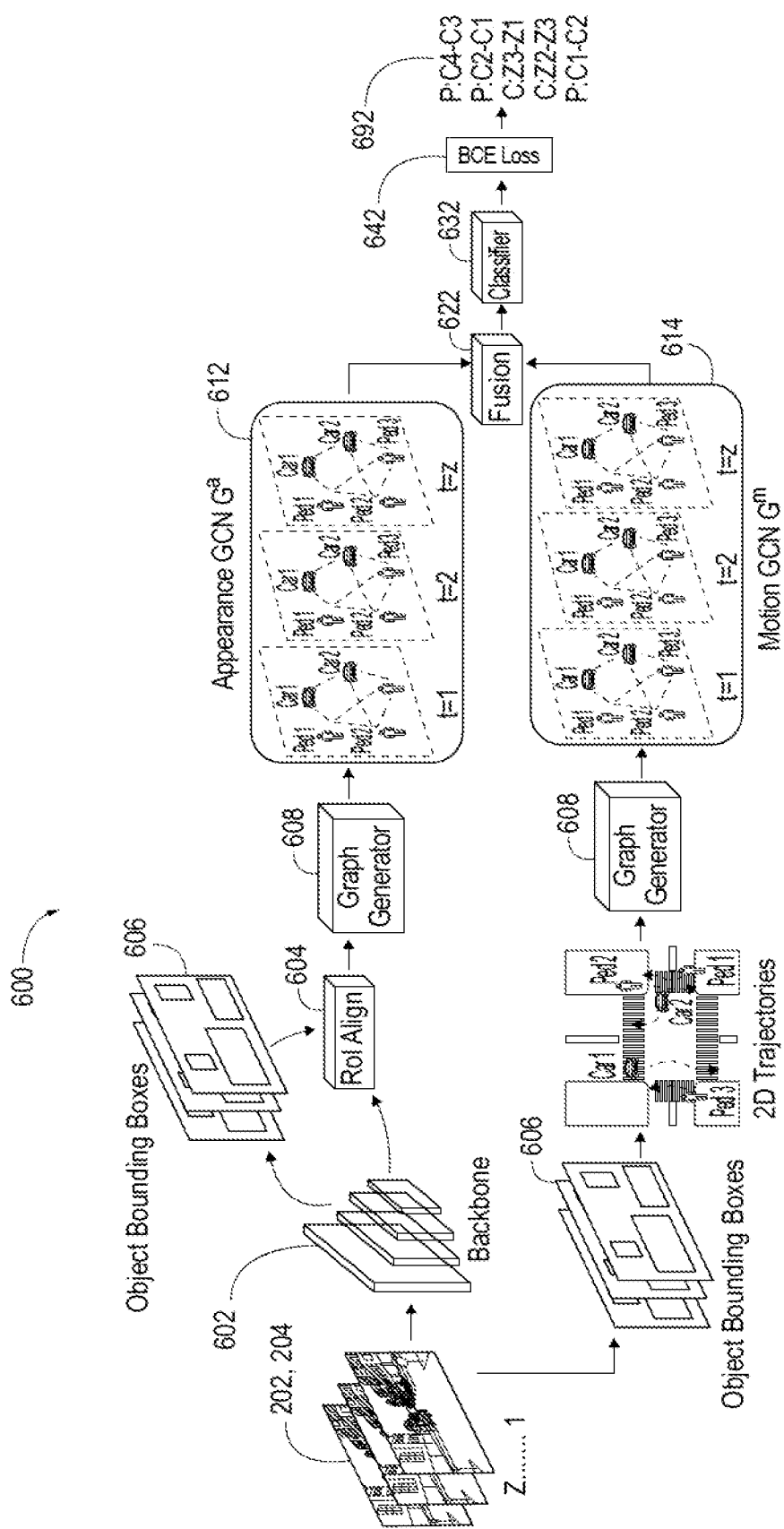
FIG. 6 is an illustrative framework for annotating action units associated with intersection scenes and intersection scenario description, according to one aspect.

The action unit annotation module 406 may be configured to communicate with the neural network 108 and/or the framework 600 of FIG. 6 to analyze respective video clips 204 and the dynamic data associated with the dynamic operation of the ego-vehicle 102 that is captured at concurrent time stamps as the respective video clips 204. With reference to FIG. 6, the framework 600 utilized by the neural network 108 to annotate action units associated with the intersection scenes 302, the neural network 108 may be able to analyze video clips 204 inputted by the action unit annotation module 406. According to one aspect, for each intersection scene 302, the neural network 108 may be configured to localize the dynamic objects location within the intersection scene 302.

The framework 600 may provide a language of traffic scenes that describes a given traffic scenario using high-level semantics in order to better understand and describe interactive scenarios. The language of traffic scenes provided by the framework 600 may represent a traffic scene as a set of action units where each action unit may be the action of a traffic participant (e.g., dynamic object) as well as the traffic participant's motion grounded in the surrounding road topology. Explained another way, the description may include actions of traffic participants (e.g., cars, pedestrians, bicyclists, or dynamic objects) and ego-vehicle, their respective locations, directions of actions, and interactive patterns. For example, intersections may be segmented into zones and corners, and each zone or each corner may have a unique ID. As previously discussed, an action unit may include a noun (e.g., pedestrian) and verb (e.g., walk from one corner to another). Moreover, the language of traffic scenes may describe a traffic scene at a video-level rather than at an instance-level to enable fast and compact description of the scene and to reduce annotation cost.

Large Scale Dataset

A large scale dataset collected from intersection scenes may be utilized to evaluate and provide baselines for three driving scene understanding tasks described herein (i.e., multi-label activity recognition, weakly-supervised phrase grounding, and driving scenario retrieval). Additionally, detailed algorithms for weakly-supervised phrase grounding and driving scenario retrieval are provided herein.

With respect the driving scenario retrieval, traffic scene attributes may be predicted or estimated utilizing monocular videos rather than multi-modal data (e.g., global positioning systems (GPS), inertial measurement units (IMU), light detection and ranging (LiDAR), and high-definition (HD) maps). Further, the driving scenario retrieval algorithm considers or accounts for the relationship between action and road structures jointly. Finally, the attributes enable research in diverse interactions among traffic participants or dynamic objects, such as vehicles, pedestrians, bicyclists, etc.

With respect the weakly-supervised phrase grounding, no natural language description of actions happening in a frame are utilized. Additionally, the weakly-supervised phrase grounding may consider multiple actions which are occurring simultaneously at a given point of time. The video for the weakly-supervised phrase grounding may be spatially unrestricted and span across a diverse change in background.

The large scale dataset may include video clips which are annotated to include action units (e.g., a combination of noun:verb, where the noun includes one of seven classes: car (C), bicyclist (K), pedestrian (P), car (E), group of cars (C+), group of bicyclists (K+), or group of pedestrians (P+) and the verb denotes motion between two corners (Cx:Cx) or zones (Zx:Zx)). Again, the action unit may include the traffic participants or dynamic objects (e.g., noun) and traffic participant actions (e.g., verb) at the video level, along with the order in which the actions occur. According to one aspect, certain nouns may not necessarily be compatible with certain verbs. For example, since cars and bicycles move on the road, cars and bicycles may be compatible with merely zones (e.g., Zx:Zy), while pedestrians may be compatible with merely corners (e.g., Cx:Cy). Further, the large scale dataset may include video clips which are annotated at an instance level to evaluate weakly supervised phrase grounding.

Additionally, the large scale dataset may provide annotation in the order in which they occur in the scene. The action units may be annotated according to their starting time, unless a yielding action happens in which case the agent yielding may be annotated later irrespective of when the action starts or ends. For example, a car yielding to a crossing pedestrian might eventually cross the zones before the pedestrian, but the latter may be labeled first.

The annotations of the large scale dataset may capture the distinction between individual and group actions, which may be lacking in existing datasets. In other words, a group of pedestrians (P+) crossing from C1:C2, for example, may be distinguished from an individual pedestrian (P) crossing from C4:C1.

Finally, intersections may be classified by type. According to one aspect, an intersection may be classified into one of four classes: Four-Way Unprotected Turn (4WUT), Four Way Protected Turn (4WPT), Four way Two Stop (4W2S) and Four Way Four Stop (4W4S). Generally, no yielding occurs at protected turns, whereas the ego-vehicle 102 may likely yield at unprotected turns for oncoming traffic.

Tasks of Multi-Label Activity Recognition, Weakly-Supervised Phrase Grounding, and Driving Scenario Retrieval The three tasks of multi-label activity recognition, weakly-supervised phrase grounding, and driving scenario retrieval may envision a vehicle system, such as a vision system to successfully reason about traffic scenes, and thus, contribute to applications in autonomous navigation and advanced driver assistance systems (ADAS). For example, multi-label classification and subsequent weakly supervised phrase grounding may facilitate human-machine interaction in ADAS where the vehicle system recognizes one or more relevant actors and/or actions in a scene (e.g. a pedestrian crossing the road) and then localizes the actor-action pair to alert the driver for collision mitigation or avoidance.

Framework and Model Overview

As seen in FIG. 6, given Z frames from an input video, the processor 124 may receive a video stream of a surrounding environment of the ego-vehicle 102 and extract tracklets of traffic agents or actors (e.g., dynamic objects within the scene, scenario, or environment). According to one aspect, the tracklets may be extracted using a Mask R-CNN pre-trained on a COCO dataset and Deep SORT. The processor 124 may sample a set of Z frames from the video and extract appearance features of N traffic agents using an Inception v3 convolutional neural network (CNN) backbone 602 and region of interest align (RoIAlign) 604, thereby providing object detection. The processor 124 may utilize the neural network 108 to compute respective object bounding boxes 606 around each of the dynamic objects in order to localize the positions of the dynamic objects located within the intersection scene 302. The processor 124 may extract motion features from the tracklets using bounding boxes 606 of the traffic agents or actors, thereby providing object tracking and object level features. In any event, the processor 124 may extract tracklets and appearance features associated with one or more dynamic objects from the surrounding environment and extract motion features associated with one or more of the dynamic objects from the surrounding environment based on the corresponding tracklets.

The processor 124 may construct, using graph generators 608, two separate neural networks, such as spatio-temporal GCNs 612, 614 $G^a$ and $G^m$ each to model both their appearance via an appearance model (e.g., describing or modeling an appearance of an actor, agent, or dynamic object) and motion via a motion model (e.g., describing or modeling motion of an actor, agent, or dynamic object) in the scene, respectively. For both the GCNs 612, 614 $G^a$ and $G^m$, each node may denote an actor or traffic agent from the scene. In other words, each node of the appearance GCN and the motion GCN may represent one of the one or more dynamic objects. In this way, the framework considers both appearance features and motion features. The processor 124 may pass the motion features and the appearance features through the GCNs $G^a$ and $G^m$. Explained again, the processor 124 may pass the appearance features through an appearance GCN to generate an appearance model and pass the motion features through a motion GCN to generate a motion model. Although GCNs 612, 614 are utilized in this example, it will be appreciated that any neural network may be utilized in place of GCNs 612, 614.

Tracking may be utilized to ensure the position of traffic agent in the graphs. The extracted, learned GCN features may be then fused together for multi-label classification, which may represent what the actors, agents, or dynamic objects are doing in the scene or environment. In other words, the processor 124 may pass the appearance model and the motion model through a fusion network 622 of the neural network 108 to generate a fusion output, pass the fusion output through a classifier 632 to generate a classifier output, and pass the classifier output through a loss function 642 to generate a multi-label classification output 692 associated with the ego-vehicle, one or more of the dynamic objects, and one or more corresponding motion paths. The fusion output may include appearance information from the appearance model, motion information from the motion model, thereby representing information from the driving scene. In this way, the processor 124 may utilize the neural network 108 to classify each of the dynamic objects as vehicles, pedestrians, and/or cyclists.

The neural network 108 may be configured to determine action unit verbs that are associated with the respective motion paths of the ego-vehicle 102 and the dynamic objects included within the intersection scene. In one configuration, the neural network 108 may combine the action unit noun (e.g., E) and the action unit verbs associated with the ego-vehicle 102 and its motion path within the intersection scene 302. The neural network 108 may further combine the action unit nouns and the action unit verbs associated with the respective dynamic objects and their respective motion paths within the intersection scene 302. Upon combining the action units associated with the ego-vehicle 102 and each of the dynamic objects travelling within the intersection scene 302, the neural network 108 may output the action unit combinations to the action unit annotation module 406.

The multi-label classification output 692 may include annotations for the ego-vehicle, dynamic objects, and corresponding motion paths using action units that describe an intersection scenario. The action units may include action unit nouns that describe the ego-vehicle and the dynamic objects and action unit verbs that describe respective motion paths of the ego-vehicle and the dynamic objects within the intersection scene. According to one aspect described in greater detail herein, weakly supervised phrase grounding may be performed to associate a label with an object in the scene.

Appearance Model Graph Convolutional Network

The graph structure of a GCN may be to utilized to explicitly model pair-wise relations between different traffic agents in the driving scene to understand and describe activities in the scene. The appearance GCN may use tracking of the agents to form the graph, which may be utilized for the task of weakly supervised phrase grounding, as described herein.

Given a set of N agents in the traffic scene with their corresponding tracklets, the processor 124 may construct a spatio-temporal graph $G_t^a = (V_t^a, A_t)$, where $V_t^a = \{v_t^i | \forall i \in \{1, \ldots, N\}\}$ may be a set of vertices of graph $G_t^a$ and $A_t = \{a_t^{ij} | \varphi i, j \in \{1, \ldots, N\}\}$ may be the adjacency matrix ∀t∈{1, . . . , Z}. In the graph, $a_t^{ij}$ may model the appearance relation between two agents at time t and may be defined as:

$$a_t^{ij} = \frac{f_p(v_t^i, v_t^j)\exp(f_a(v_t^i, v_t^j))}{\sum_{j=1}^{N} f_p(v_t^i, v_t^j)\exp(f_a(v_t^i, v_t^j))} \quad (1)$$

where $f_a(v_t^i, v_t^j)$ may indicate the appearance relation between agents i and j at time t, and $f_p(v_t^i, v_t^j)$ may be an indicator function which determines the presence of a tracklet. A softmax function may be used to normalize the influence on agent i from other objects or dynamic objects. The appearance relation may be calculated as below:

$$f_a(v_t^i, v_t^j) = \frac{\theta(v_t^i)^T \phi(v_t^j)}{\sqrt{D}} \quad (2)$$

where $\theta(v_t^i)=wv_t^i$ and $\phi(v_t^j)=w'v_t^j$. Both $w \in \mathbb{R}^{D \times D}$ and $w' \in \mathbb{R}^{D \times D}$ may be learnable parameters which map appearance features to a subspace and enable learning the correlation of two objects, and $\sqrt{D}$ may be a normalization factor. The processor 124 may consider missing nodes due to both inconsistencies in tracking and agents entering and leaving the traffic scene at different times. In order to mitigate this issue, adjacency matrix values may be set to zero when an object may be missing using indicator function $f_p$ as:

$$f_p(v_t^i, v_t^j) = \mathbb{I}(v_t^i = \text{present and } v_t^j = \text{present}) \quad (3)$$

Once the nodes and the adjacency matrix values are defined, the processor 124 may reason over the GCN. For example, the GCN may receive a graph as an input, perform computations over the structure, and return a graph as output. For a target node i in the graph, the GCN may aggregate features from all neighbor nodes according to values in the adjacency matrix. According to one aspect, one layer of GCN may be written as:

$$Z^{(l+1)} = \sigma A Z^{(l)} W^{(l)} \quad (4)$$

where $A \in \mathbb{R}^{NZ \times NZ}$ may be the adjacency matrix for appearance model. $Z^l \in \mathbb{R}^{NZ \times D}$ may be the feature representations of nodes in the lth layer. $W^l \in \mathbb{R}^{D \times D}$ may be the layer-specific learnable weight matrix. $\sigma(\cdot)$ may denote an activation function, and Rectified Linear Units (ReLU) may be implemented. This layer-wise propagation may be stacked into multi-layers.

Motion Model Graph Convolutional Network

Although the motion in the labels may be based on a fixed infrastructure and does not necessarily account for ego-vehicle motion, the processor 124 may model the motion of agents in 2D to solve the problem from an ego-centric view. In this regard, the neural network 108 may be configured to analyze the dynamic data associated with the dynamic operation of the ego-vehicle 102 that is captured at concurrent time stamps as the respective video clips 204 as an input by the action unit annotation module 406. The neural network 108 may be further configured to analyze positional differences of the dynamic objects located within the intersection scene 302 as the ego-vehicle 102 and the dynamic objects approach, enter, pass through, and exit the intersection scene 302. The neural network 108 may be configured to process a two-dimensional positional representation of motion paths of the ego-vehicle 102 and the respective motion paths of each of the dynamic objects travelling within the intersection scene 302.

According to one aspect, the scenarios in the dataset may be clipped to when the ego-vehicle is about to enter the intersections to more clearly capture the actions of different agents. Due to this, ego-vehicle motion may be minimized or mitigated. Second, action units may start prior to or before the action unit of the ego-vehicle, which means the ego-vehicle may observe a portion of the action units while mostly either yielding or stopping. In this regard, the motion model may be based on action recognition and trajectory prediction space. Since the data may be collected in different urban and suburban areas with varying intersection parameters, (e.g., road width, sidewalk width) relative motion between tracklets at different times t may be utilized as the input to the graph rather than absolute coordinates in the image space.

The processor 124 may construct another spatio-temporal graph $G_t^m = (V_t^m, E_t)$, where $V_t = \{u_t^i | \forall i \in \{1, \ldots, N\}\}$ may be the set of vertices of graph $G_t^m$ and $E_t = \{e_t^{ij} | \forall i,j \in \{1, \ldots, N\}\}$ may be the set of edges. The processor 124 may set $e_t^{ij} = 1$ if $e_t^i$ and $e_t^j$ are connected, and set $e_t^{ij} = 0$ otherwise. The processor 124 may attach a value $b_t^{ij}$ in order to model the relation between two nodes i and j, which may be computed by a kernel function for each $e_t^{ij}$. According to one aspect, $b_t^{ij}$ may be organized into the weighted adjacency matrix $B_t$. According to one aspect, $b_{sim,t}^{ij}$ may be introduced as a kernel function to be used within the adjacency matrix $B_t$. Additionally, $b_{sim,t}^{i,j}$ may be defined as:

$$b_{sim,t}^{i,j} = \begin{cases} \frac{1}{\|u_t^i - u_t^j\|_2}, & \|u_t^i - u_t^j\|_2 \neq 0 \\ 1, & u_t^i \text{ or } u_t^j \text{ missing} \\ 0, & \text{otherwise} \end{cases} \quad (5)$$

where $u_t^i$ may be a 2D position of agent i at time t and defined as:

$$u_t^i = [c_x, c_y] \quad (6)$$

where $c_x$ and $c_y$ may be centers of bounding box for agent i at time t. Once the nodes, edges, and adjacency matrix for motion GCN are formed, the processor 124 may perform a spatio-temporal graph convolution operation.

Loss Function

Once the motion and appearance graphs are built, the processor 124 may extract feature representations learned through the GCNs and fuse the feature representations together for classification. Since both the motion graph and the appearance graph may include tracklets, there may be different ways in which information from the two graphs may be linked. According to one aspect, a late fusion may be performed, because the tracklet information may not necessarily be consistent. However, a variety of fusion techniques may be utilized. The whole model may be trained in an end-to-end manner with backpropagation. Combining this with standard binary cross entropy (BCE) loss, the final loss function may be defined as:

$$\mathcal{L} = -\frac{1}{R}\sum_{i=1}^{R} y_i \log(p(y_i)) + (1 - y_i)\log(1 - p(y_i)) \quad (7)$$

where y may be the label, p(y) may be the predicted probability, and R may be the batch size. The loss function may be a binary cross entropy (BCE) loss function. In this way, BCE loss may be utilized to train the model for multi-label classification.

Weakly Supervised Phrase Grounding

Generally, the phrase grounding task may include learning the correspondences between text phrases and image/video regions from a given training set of region-phrase mappings. In other words, weakly supervised phrase grounding may be performed to associate a label with an object in the scene, which may be identifying using a bounding box, for example. According to one aspect, there may be a way to learn the correspondence between a phrase, denoted by an action unit in the dataset, with a particular agent in the traffic scene across time.

Given an intersection scenario S=(V, P), where $V=\{v_t^i | \forall i \in \{1, \ldots, N\}, \forall t \in \{1, \ldots, Z\}\}$ is the set of agents in the scene and $P=\{p_t^i | \forall i \in \{1, \ldots, N\}, \forall t \in \{1, \ldots, Z\}\}$ is the set of tracklets, the corresponding video level labels may be $L=\{l_1, l_2, \ldots, l_q\}$ where q is the total number of action units in S. The goal may be to create a function b:L→P that links every label l with a tracklet p. According to one aspect, the processor 124 may, for weakly supervised phrase grounding, convert or modify the last fully connected layer in the model (e.g., the last fully connected layer in the fusion network and classifier) as a set of weights $W = \{w_{i,j} | \forall i \in \{1, \ldots, N\}, \forall j \in \{1, \ldots, C\}\}$ between a number of nodes N in the graph and total number of classes C in the binary cross entropy loss. The model I may take as input S and generate activations $A_S$ in the last fully connected layer. In this regard, the goal may be to find the activation, and by association the node, which has the maximum impact on the probability score of label l.

Weakly supervised phrase grounding may be performed by converting the architecture of FIG. 6 slightly and modifying a last fully connected layer of the fusion network and a last fully connected layer of the classifier as a set of weights between a number of nodes from the appearance GCN and the motion GCN and a total number of classes from the loss function. Therefore, instead of having a multi-layer perception take the input, these combination of features, weakly supervised phrase grounding may directly use these node features as the input to the last layer for the fusion network and the classifier.

According to one aspect, the processor, architecture, or framework may be utilized to perform weakly supervised phrase grounding, such as via the "Exemplary Weakly Supervised Phrase Grounding Algorithm" described herein.

Figure 12:
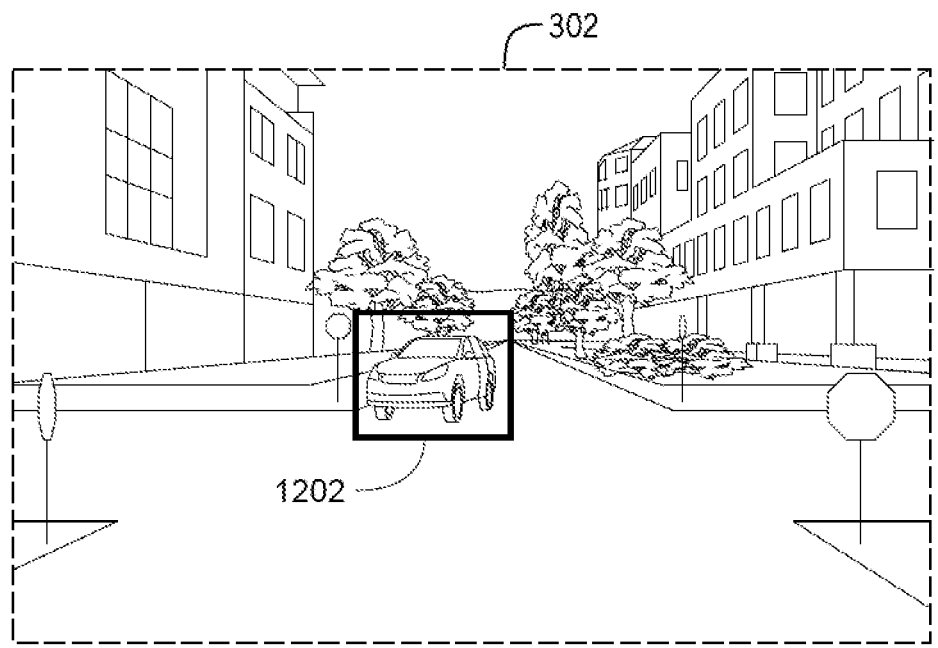
FIG. 12 is an illustrative example of an intersection scene bounding box that may presented, according to one aspect.

According to one aspect, one or more vehicle systems, such as a heads-up display (HUD) system, may be utilized to present the correspondences or associations obtained from the weakly supervised phrase grounding. For example, the HUD may highlight a bounding box around a dynamic object (e.g., bounding box 1202 in FIG. 12), such as an additional vehicle, pedestrian, cyclist, etc. In this regard, FIG. 12 is an illustrative example of an intersection scene bounding box that may presented to a user, according to one aspect.

Exemplary Weakly Supervised Phrase Grounding Algorithm

```
input: L, P, V, model I
Output: b : L → P, Phrase Detection %
1:      g = argmax{abs(W * As)}
2:      for i ← 1 to q do:
3:          t_p = 0
4:          j = class index of l_i in L
5:          b(l_i) = node corresponding to g{j}
6:          for f ← 1 to # frames in l_i do:
7:              if f in g{j} then:
8:                  bbox1 = frame in l_i
9:                  bbox2 = frame in node c{j}
10:                 if IoU{bbox_1, bbox_2} ≥ 0.5 then:
11:                     tp += 1
12:         PD = t_p / #frames
return b, PD
```

Scenario Retrieval

There may be a huge diversity in daily driving scenarios and driving behaviors, which may result in a desire for extensive human driving data to build a comprehensive driving behavior understanding system. However, mining large-scale human driving data for driving behavior understanding may present significant challenges. In this regard, the data may be filtered and the algorithm may be used to retrieve scenarios for driver behavior understanding.

Give an intersection scenario $S_q=(V, P)$ from query set Q, each l in L may have the format of noun:verb, where the former may denote the type of agent and the latter may provide the direction of motion. When retrieving scenarios for driver behavior understanding, it may be desirable to match the configuration of the traffic scene based on action units and to independently focus on the type of agent and motion dynamics. For example, the focus for retrieving a certain scenario may be based on the number of type of agents in the scene (e.g., a vehicle, a pedestrian, or both), while at other times, the direction of motion of traffic participant (e.g., Z1-Z2 or C1-C2) may be desired. Therefore, the processor 124 may formulate a metric which considers all three factors: action units, noun, and verbs. For example, a prediction dictionary may be formed, such as by using an action combination, a verb combination, or a noun combination.

The driving scenarios database may be considered as F and the goal may be to retrieve top K similar scenarios $S_f^i=(V, P) \forall i \in \{1, \ldots, K\}$ given $S_q$. The processor 124 may first retrieve top K scenarios using a hamming distance between predicted binary labels for $s_q$ and ground truth labels for $S_f \forall f \in \{1, \ldots, F\}\}$. Thus, the processor 124 may retrieve one or more intersection scenarios based on a query of an electronic dataset that stores a combination of action units and/or based on a hamming distance between predicted binary labels for the intersection scenario and ground truth labels. Once the top K scenarios are retrieved, the processor 124 may convert predicted labels for $S_q$ and L into dictionaries $M_{S_q}$ and $M_{S_f}$ respectively, where the key may be a noun, a verb, or an action unit and values may be their instances or frequencies in the output. The dictionaries $M_{S_q}$ and $M_{S_f}$ may be frequency dictionaries. The ground truth may be converted into a dictionary. The processor 124 may consider a retrieved scenario to be a match if $M_{S_q}$ is a subset of $M_{S_f}$. Stated another way, a match may be determined when the query, the output dictionary is a subset of the ground truth dictionary.

According to one aspect, outputs of the processor, architecture, or framework (e.g., the multi-label classification output) may be utilized to perform driving scenario retrieval, such as via the "Exemplary Scenario Retrieval Algorithm" described herein or via the intersection scenario application 104 and modules of FIG. 4. According to one aspect, the processor, architecture, or framework may build a database for training neural networks based on parameters associated the query.

Exemplary Scenario Retrieval Algorithm

--- input: L, P, V, model I
Output: recall@topK
1:  $t_p = 0, f_p = 0, f_n = 0$
2:  top K = Hamming($I(S_q)$, L)
3:  for k ← 1 to K do:
4:   for i ← 1 to q do:
5:    if $M_{S_Q} \subseteq M_{S_F}$ then:
6:     $t_p += 1$
7:    else
8:     $f_p += 1$
9:  for k ← 1 to {F − K} do:
10:   for i ← 1 to q do:
11:    if $M_{S_Q} \subseteq M_{S_F}$ then:
12:     $f_n += 1$ return call = $\dfrac{t_p}{t_p + f_n}$

---

Referring again to the method 500 of FIG. 5, the method 500 may proceed to block 508, wherein the method 500 may include storing the action unit combinations upon the intersection scenario database 106. According to one aspect, upon receiving the action unit combinations associated with the ego-vehicle 102 and the dynamic objects included within each of the intersection scenes, the action unit annotation module 406 may be configured to access the intersection scenario database 106. The action unit annotation module 406 may be configured to create a respective data record within a field that pertains to the type of intersection configuration as the intersection scene 302.

The data record may be populated with annotated action units as intersection scenarios. The data record may additionally be populated with a data tag that links the annotated action units to one or more stored video clips 204 of the respective intersection scene 302 that include the dynamic objects and motion paths described by the annotated action units upon the memory 126 of the external server 120.

Accordingly, the action unit annotation module 406 may populate the intersection scenario database 106 with respective intersection scenarios that may include one or more action unit combinations that are associated with respective intersection scenes 302 through linked video clips 204 stored on the memory 126 of the external server 120.

The method 500 may proceed to block 510, wherein the method 500 may include retrieving an intersection scenario based on a query of the annotated action units. According to one aspect, the intersection scenario application 104 may be configured to allow the user 210 to initiate the search mode of the intersection scenario application 104 through a respective graphical user interface of the intersection scenario application 104. The search mode may enable the intersection scenario application 104 to control the presentation of an intersection scenario retrieval user interface that may be utilized by the user 210 to view one or more intersection scenario video clips 212 that are associated with a particular intersection scenario based on the input of object and motion search inputs 214 that are provided by the user 210.

Figure 7:
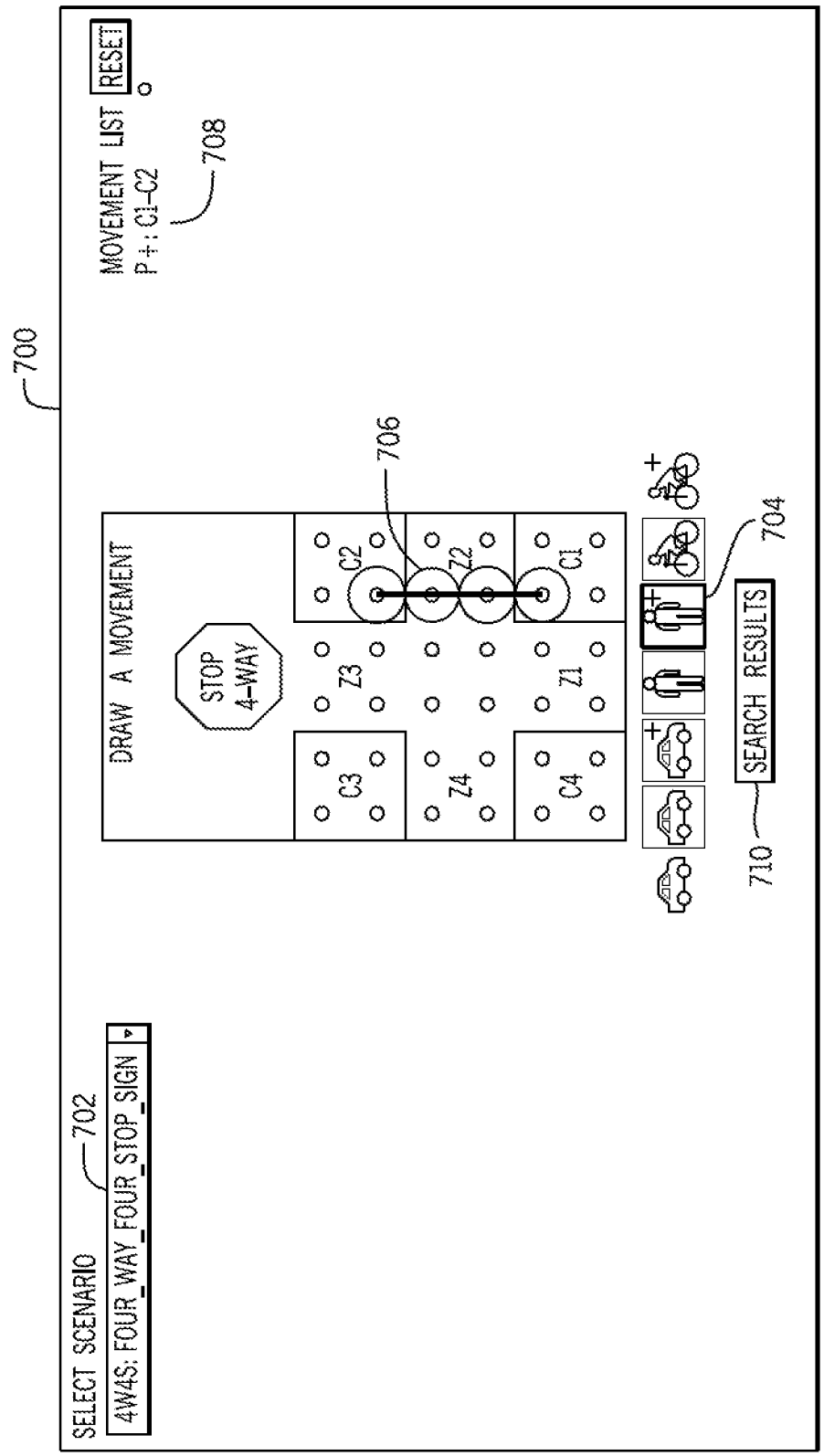
FIG. 7 is an illustrative example of the intersection scenario retrieval user interface of the intersection scenario application, according to one aspect.

FIG. 7 is an illustrative example of the intersection scenario retrieval user interface 700 of the intersection scenario application 104, according to one aspect. In one configuration, one or more electronic display screens may be electronically controlled by the intersection scenario application 104 to present the intersection scenario retrieval user interface 700 as a human machine interface of the intersection scenario application 104 to be utilized by the user 210.

As shown in the illustrative example of FIG. 7, the intersection scenario retrieval user interface 700 may include an intersection configuration drop down menu 702 that may enable the user 210 to select a type of intersection configuration (e.g., four way intersection, three way intersection, etc.) of the intersection scenario the user 210 would like to view. In other words, the intersection configuration drop down menu 702 may allow the user 210 to view intersection scenario video clips 212 that include a specific type of intersection configuration.

The intersection scenario retrieval user interface 700 may additionally include dynamic object selection input icons 704 that may pertain to the types of dynamic objects that the user 210 may select as being included within the intersection scenario video clips 212 that may be presented to the user 210. As shown, the dynamic object selection input icons 704 may include icons that may be selected to present intersection scenario video clips 212 with egocentric views of intersection scenes 302 that include dynamic objects such as a car, a group of vehicles, a pedestrian, a group of pedestrians, a cycle, and/or a group of cycles.

Additionally, the intersection scenario retrieval user interface 700 may include a selectable intersection grid 706 that may be utilized by the user 210 to select one or more types of motion paths that may be associated with the ego-vehicle 102 and/or one or more dynamic objects selected based on the input of one or more of the dynamic object selection input icons 704. In one configuration, the selectable intersection grid 706 may include input grid points that may be selected to provide a respective motion pattern that may be associated with each respective dynamic object. For example, as shown in the illustrative example of FIG. 7, the user 210 has selected the dynamic object selection input icons 704 and has inputted grid points (designated by circles) to formulate a motion path that may be associated with a selected group of pedestrians (P+) as an inputted dynamic object selection input icon.

As shown, the intersection scenario retrieval user interface 700 may include a scenario user interface graphic 708 that includes the selected inputs provided with respect to the input of object and motion search inputs 214 based on the inputted dynamic object selection input icons 704 and the selectable intersection grid 706. The scenario user interface graphic 708 presents the selected inputs in the video true traffic language as a combined action unit noun describing the group of pedestrians: P+ and the action unit verbs describing the selected motion path of the group of pedestrians: C1-C2.

According to one aspect, upon the input of a search results user interface input icon 710 presented on the intersection scenario retrieval user interface 700, the scenario retrieval module 408 may be configured to query the intersection scenario database 106 with the combined action units based on the user's input of object and motion search inputs 214 provided with respect to the intersection configuration drop down menu 702, the dynamic object selection input icons 704, and the selectable intersection grid 706. In other words, the scenario retrieval module 408 may be configured to query the intersection scenario database 106 to retrieve data records that include an intersection scenario that pertains to a type of intersection configuration, one or more particular dynamic objects that are included within the intersection scene 302 pertaining to the type of the intersection configuration, and respective motion paths of the ego-vehicle 102 and/or the one or more particular dynamic objects included within the intersection scene 302, as selected by the user's input of object and motion search inputs 214.

According to one aspect, upon querying the intersection scenario database 106 with the action unit combinations based on the user's selected inputs, the scenario retrieval module 408 may be configured to retrieve data records that pertain to intersection scenarios that are described by the action unit combinations. Such data records may be included within a particular field that is associated with the selected type of intersection configuration (based on the user's selection of the intersection configuration drop down menu 702) and may include a data tag that links the annotated action units to one or more stored video clips 204 of the respective intersection scene 302.

The scenario retrieval module 408 may thereby access the memory 126 of the external server 120 to retrieve the one or more stored video clips 204 and may operably control the intersection scenario retrieval user interface 700 to present a video playback player to electronically control one or more display screens to present the stored video clips 204 as intersection scenario video clips 212 that are associated with the particular intersection scenario based on the input of object and motion search inputs 214 that are provided by the user 210.

Figure 8:
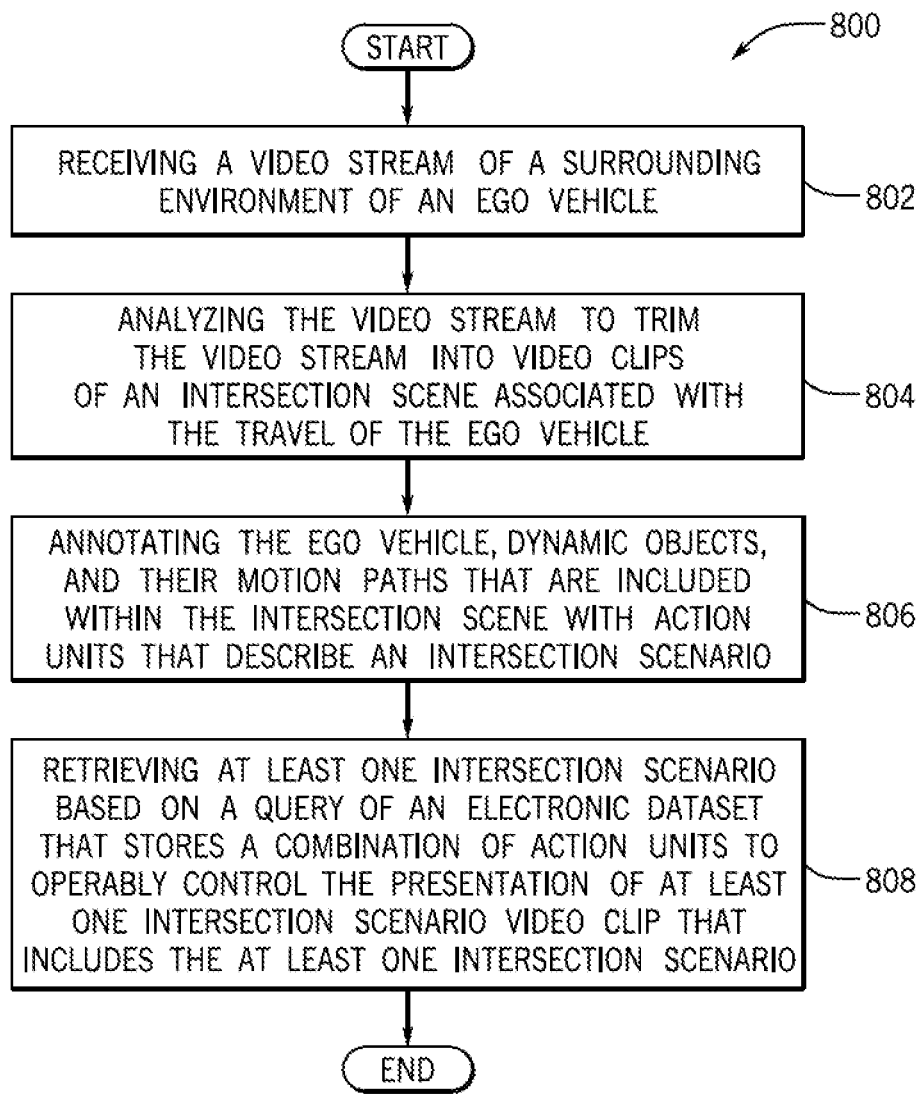
FIG. 8 is a process flow diagram of a method for performing intersection scenario retrieval, according to one aspect.

FIG. 8 is a process flow diagram of a method 800 for performing intersection scenario retrieval, according to one aspect. FIG. 8 will be described with reference to the components of FIGS. 1-4, the method 800 of FIG. 8 may be used with additional and/or alternative system components. The method 800 may begin at block 802, wherein the method 800 may include receiving a video stream 202 of a surrounding environment of an ego-vehicle 102.

The method 800 may proceed to block 804, wherein the method 800 may include analyzing the video stream 202 to trim the video stream into video clips 204 of an intersection scene 302 associated with the travel of the ego-vehicle 102. The method 800 may proceed to block 806, wherein the method 800 may include annotating the ego-vehicle 102, dynamic objects, and their motion paths that are included within the intersection scene 302 with action units that describe an intersection scenario.

According to one aspect, the action units include action unit nouns that describe the ego-vehicle 102 and the dynamic objects and action unit verbs that describe respective motion paths of the ego-vehicle 102 and the dynamic objects within the intersection scenes 302. The method 800 may proceed to block 808, wherein the method 800 may include retrieving at least one intersection scenario based on a query of an electronic dataset that stores a combination of action units to operably control a presentation of at least one intersection scenario video clip that includes the at least one intersection scenario.

Figure 9:
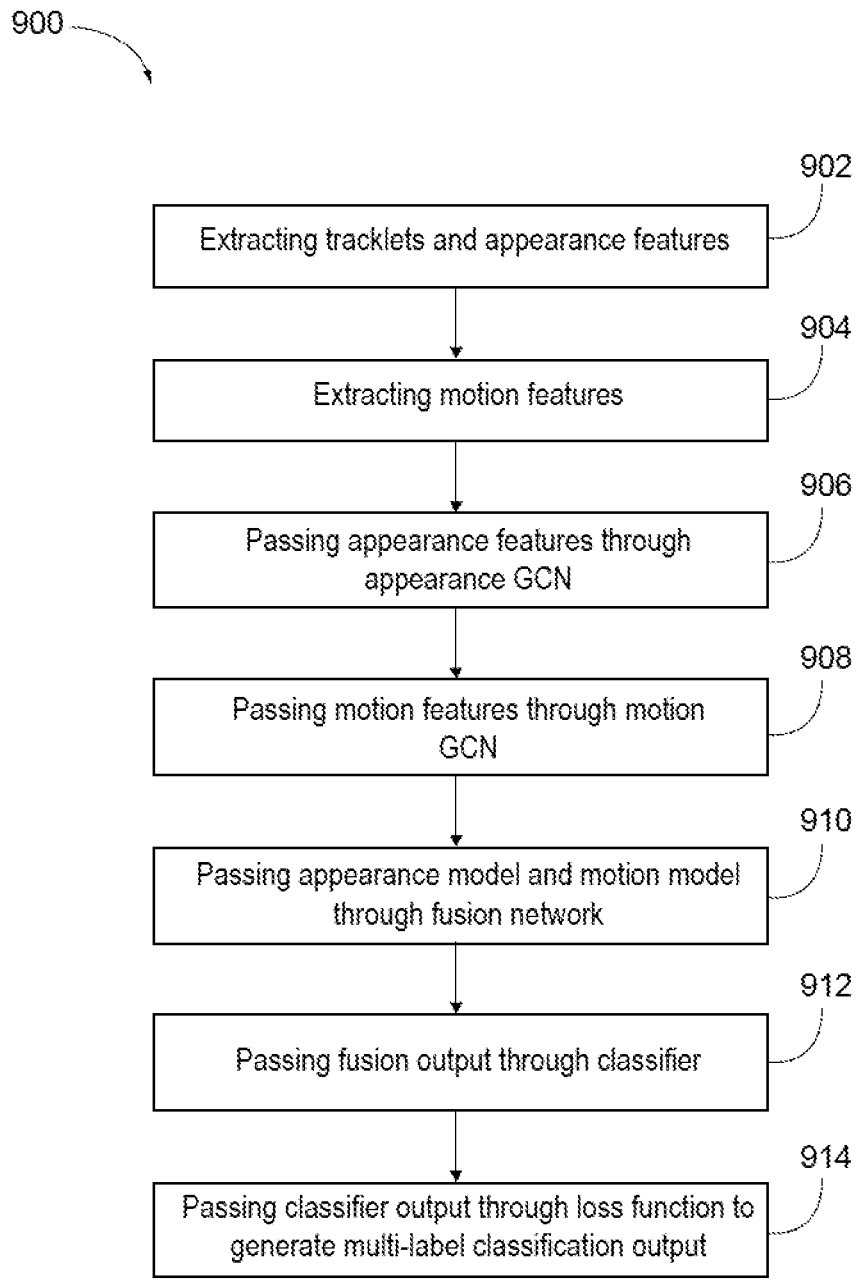
FIG. 9 is a process flow diagram of a method for performing intersection scenario retrieval, according to one aspect.

FIG. 9 is a process flow diagram of a method 900 for performing intersection scenario retrieval, according to one aspect. For example, a computer-implemented method 900 for intersection scenario description may include receiving a video stream of a surrounding environment of an ego-vehicle, extracting 902 tracklets and appearance features associated with one or more dynamic objects from the surrounding environment, extracting 904 motion features associated with one or more dynamic objects from the surrounding environment based on the corresponding tracklets, passing 906 the appearance features through an appearance neural network to generate an appearance model, passing 908 the motion features through a motion neural network to generate a motion model, passing 910 the appearance model and the motion model through a fusion network to generate a fusion output, passing 912 the fusion output through a classifier to generate a classifier output, and passing 914 the classifier output through a loss function to generate a multi-label classification output indicative of the ego-vehicle, one or more of the dynamic objects, and one or more corresponding motion paths. Additionally, weakly supervised phrase grounding may be performed by converting a last fully connected layer of the fusion network and a last fully connected layer of the classifier as a set of weights between a number of nodes from the appearance neural network and the motion neural network and a total number of classes from the loss function. Intersection scenario retrieval may be performed as well, such as via the "Exemplary Scenario Retrieval Algorithm".

Figure 10:
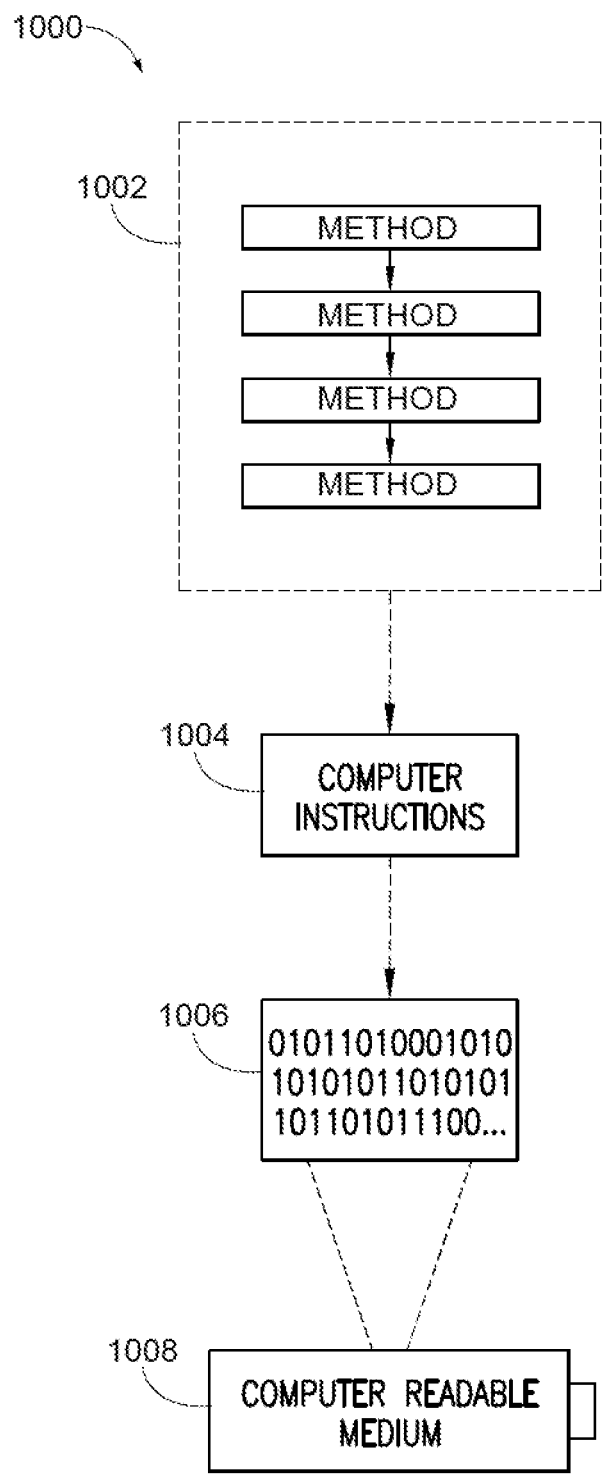
FIG. 10 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 10, wherein an implementation 1000 includes a computer-readable medium 1008, such as a CD-R, DVD-R, flash drive, a platter of a hard disk drive, etc., on which is encoded computer-readable data 1006. This encoded computer-readable data 1006, such as binary data including a plurality of zero's and one's as shown in 1006, in turn includes a set of processor-executable computer instructions 1004 configured to operate according to one or more of the principles set forth herein. In this implementation 1000, the processor-executable computer instructions 1004 may be configured to perform a method 1002, such as the method 500 of FIG. 5, the method 800 of FIG. 8, or the method 900 of FIG. 9. In another aspect, the processor-executable computer instructions 1004 may be configured to implement a system, such as the system 100 or ego-vehicle 102 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 11:
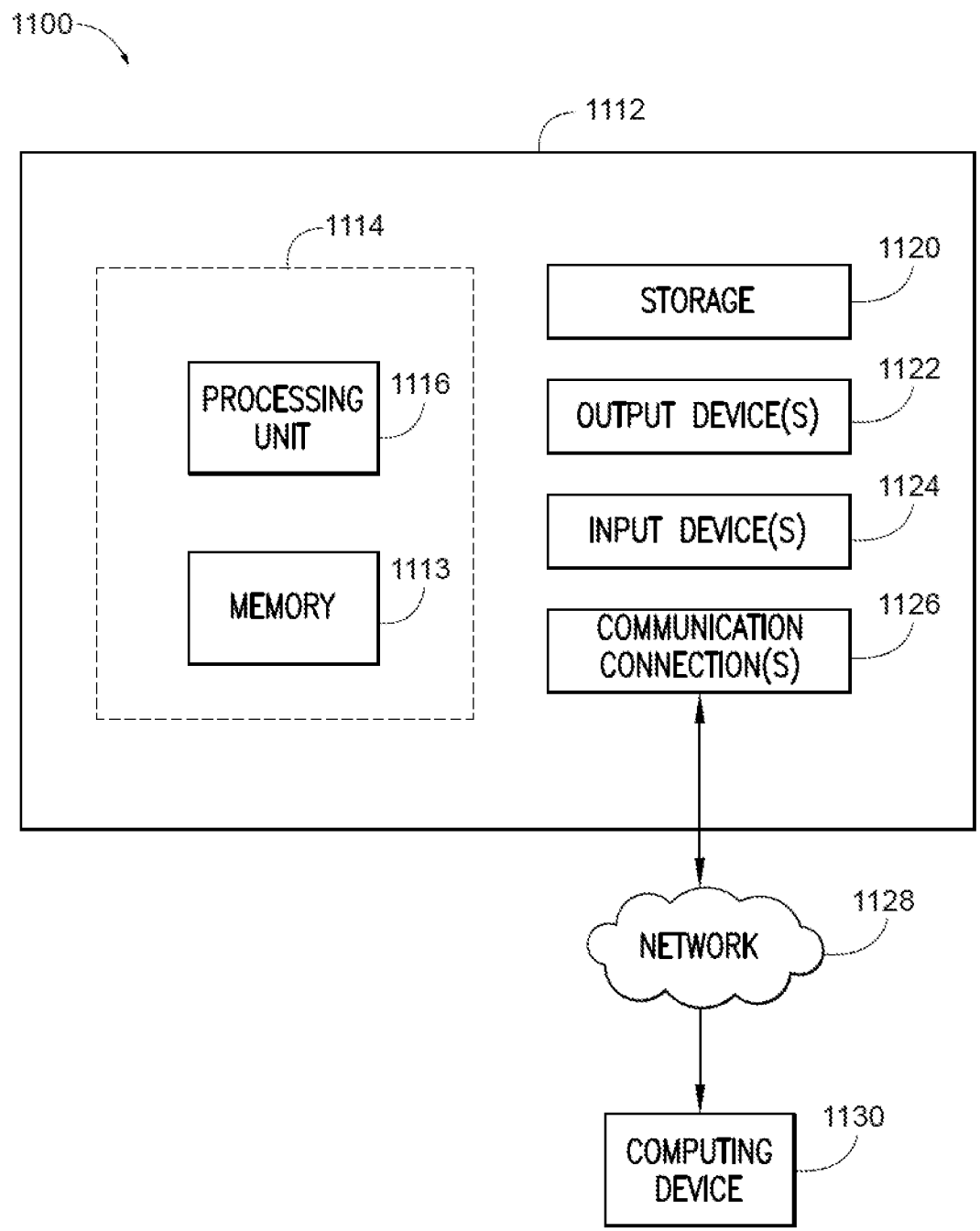
FIG. 11 is an illustration of an example computing environment where one or more of the provisions set forth herein are implemented, according to one aspect.

FIG. 11 and the following discussion provide a description of a suitable computing environment to implement aspects of one or more of the provisions set forth herein. The operating environment of FIG. 11 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 11 illustrates a system 1100 including a computing device 1112 configured to implement one aspect provided herein. In one configuration, the computing device 1112 includes at least one processing unit 1116 and memory 1118. Depending on the exact configuration and type of computing device, memory 1118 may be volatile, such as RAM, non-volatile, such as ROM, flash memory, etc., or a combination of the two. This configuration is illustrated in FIG. 11 by dashed line 1114.

In other aspects, the computing device 1112 includes additional features or functionality. For example, the computing device 1112 may include additional storage such as removable storage or non-removable storage, including, but not limited to, magnetic storage, optical storage, etc. Such additional storage is illustrated in FIG. 11 by storage 1120. In one aspect, computer readable instructions to implement one aspect provided herein are in storage 1120. Storage 1120 may store other computer readable instructions to implement an operating system, an application program, etc. Computer readable instructions may be loaded in memory 1118 for execution by the at least one processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1112. Any such computer storage media is part of the computing device 1112.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1112 includes input device(s) 1124 such as keyboard, mouse, pen, voice input device, touch input device, infrared cameras, video input devices, or any other input device. Output device(s) 1122 such as one or more displays, speakers, printers, or any other output device may be included with the computing device 1112. Input device(s) 1124 and output device(s) 1122 may be connected to the computing device 1112 via a wired connection, wireless connection, or any combination thereof. In one aspect, an input device or an output device from another computing device may be used as input device(s) 1124 or output device(s) 1122 for the computing device 1112. The computing device 1112 may include communication connection(s) 1126 to facilitate communications with one or more other devices 1130, such as through network 1128, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

It should be apparent from the foregoing description that various aspects of the disclosure may be implemented in hardware. Furthermore, various aspects may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, any flow charts, flow diagrams, state transition diagrams, pseudo code, and the like represent various processes which may be substantially represented in machine readable media and so executed by a computer or processor, whether or not such computer or processor is explicitly shown.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc.

For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for intersection scenario description, comprising:
   a processor; and
   a memory storing instructions which, when executed by the processor cause the processor to perform:
   receiving a video stream of a surrounding environment of an ego-vehicle;
   extracting tracklets and appearance features associated with one or more dynamic objects from the surrounding environment;
   extracting motion features associated with one or more dynamic objects from the surrounding environment based on the corresponding tracklets;
   passing the appearance features through an appearance neural network to generate an appearance model;
   passing the motion features through a motion neural network to generate a motion model;
   passing the appearance model and the motion model through a fusion network to generate a fusion output;
   passing the fusion output through a classifier to generate a classifier output; and
   passing the classifier output through a loss function to generate a multi-label classification output associated with the ego-vehicle, one or more of the dynamic objects, and one or more corresponding motion paths.

2. The system for intersection scenario description of claim 1, wherein weakly supervised phrase grounding is performed by converting a last fully connected layer of the fusion network and a last fully connected layer of the classifier as a set of weights between a number of nodes from the appearance neural network and the motion neural network and a total number of classes from the loss function.

3. The system for intersection scenario description of claim 1, wherein the loss function is a binary cross entropy (BCE) loss function.

4. The system for intersection scenario description of claim 1, wherein the appearance features are extracted using an Inception v3 convolutional neural network (CNN) and region of interest align (RoIAlign).

5. The system for intersection scenario description of claim 1, wherein each node of the appearance neural network and the motion neural network represents one of the one or more dynamic objects.

6. The system for intersection scenario description of claim 1, wherein the multi-label classification output includes annotations for the ego-vehicle, dynamic objects, and corresponding motion paths using action units that describe an intersection scenario, wherein the action units include action unit nouns that describe the ego-vehicle and the dynamic objects and action unit verbs that describe respective motion paths of the ego-vehicle and the dynamic objects within the intersection scene.

7. The system for intersection scenario description of claim 6, wherein the processor retrieves one or more intersection scenarios based on a query of an electronic dataset that stores a combination of action units.

8. The system for intersection scenario description of claim 7, wherein the processor retrieves one or more of the intersection scenarios based on a hamming distance between predicted binary labels for the intersection scenario and ground truth labels.

9. The system for intersection scenario description of claim 8, wherein the processor converts predicted binary labels for the intersection scenario into dictionaries.

10. The system for intersection scenario description of claim 7, wherein the processor builds a database for training neural networks based on parameters associated the query.

11. A computer-implemented method for intersection scenario description, comprising:
    receiving a video stream of a surrounding environment of an ego-vehicle;
    extracting tracklets and appearance features associated with one or more dynamic objects from the surrounding environment;
    extracting motion features associated with one or more dynamic objects from the surrounding environment based on the corresponding tracklets;
    passing the appearance features through an appearance neural network to generate an appearance model;
    passing the motion features through a motion neural network to generate a motion model;
    passing the appearance model and the motion model through a fusion network to generate a fusion output;
    passing the fusion output through a classifier to generate a classifier output; and
    passing the classifier output through a loss function to generate a multi-label classification output indicative of the ego-vehicle, one or more of the dynamic objects, and one or more corresponding motion paths.

12. The computer-implemented for intersection scenario description of claim 11, comprising performing weakly supervised phrase grounding by converting a last fully connected layer of the fusion network and a last fully connected layer of the classifier as a set of weights between a number of nodes from the appearance neural network and the motion neural network and a total number of classes from the loss function.

13. The computer-implemented for intersection scenario description of claim 11, wherein the loss function is a binary cross entropy (BCE) loss function.

14. The computer-implemented for intersection scenario description of claim 11, wherein the appearance features are extracted using an Inception v3 convolutional neural network (CNN) and region of interest align (RoIAlign).

15. The computer-implemented for intersection scenario description of claim 11, wherein each node of the appearance neural network and the motion neural network represents one of the one or more dynamic objects.

16. The computer-implemented for intersection scenario description of claim 11, wherein the multi-label classification output includes annotations for the ego-vehicle, dynamic objects, and corresponding motion paths using action units that describe an intersection scenario, wherein the action units include action unit nouns that describe the ego-vehicle and the dynamic objects and action unit verbs that describe respective motion paths of the ego-vehicle and the dynamic objects within the intersection scene.

17. A system for intersection scenario description, comprising:

a processor; and a memory storing instructions which, when executed by the processor cause the processor to perform:

receiving a video stream of a surrounding environment of an ego-vehicle;

extracting tracklets and appearance features associated with one or more dynamic objects from the surrounding environment;

extracting motion features associated with one or more dynamic objects from the surrounding environment based on the corresponding tracklets;

passing the appearance features through an appearance neural network to generate an appearance model;

passing the motion features through a motion neural network to generate a motion model;

passing the appearance model and the motion model through a fusion network to generate a fusion output;

passing the fusion output through a classifier to generate a classifier output; and passing the classifier output through a loss function to generate a multi-label classification output indicative of the ego-vehicle, one or more of the dynamic objects, and one or more corresponding motion paths, wherein during weakly supervised phrase grounding, a last fully connected layer of the fusion network and a last fully connected layer of the classifier include a set of weights between a number of nodes from the appearance neural network and the motion neural network and a total number of classes from the loss function.

18. The system for intersection scenario description of claim 17, wherein the loss function is a binary cross entropy (BCE) loss function.

19. The system for intersection scenario description of claim 17, wherein the appearance features are extracted using an Inception v3 convolutional neural network (CNN) and region of interest align (RoIAlign).

20. The system for intersection scenario description of claim 17, wherein each node of the appearance neural network and the motion neural network represents one of the one or more dynamic objects.

\* \* \* \* \*